(12) United States Patent
Dodd

(10) Patent No.: US 8,401,183 B2
(45) Date of Patent: Mar. 19, 2013

(54) METHOD AND SYSTEM FOR KEYING AND SECURELY STORING DATA

(75) Inventor: Thomas Lance Dodd, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1231 days.

(21) Appl. No.: 11/965,173

(22) Filed: Dec. 27, 2007

(65) Prior Publication Data

US 2009/0169016 A1 Jul. 2, 2009

(51) Int. Cl.
*H04L 9/00* (2006.01)
(52) U.S. Cl. .............................. 380/44; 726/26
(58) Field of Classification Search .......... 380/277–279, 380/286, 44–45; 726/26–30; 707/636; 709/217
See application file for complete search history.

(56) References Cited

U.S. PATENT DOCUMENTS

| | | | | |
|---|---|---|---|---|
| 4,731,840 A * | 3/1988 | Mniszewski et al. | ......... | 380/284 |
| 6,915,434 B1 * | 7/2005 | Kuroda et al. | ................ | 713/193 |
| 6,931,549 B1 * | 8/2005 | Ananda | ............................ | 726/26 |
| 7,158,979 B2 * | 1/2007 | Iverson et al. | ................. | 707/741 |
| 7,962,641 B1 * | 6/2011 | Dhuse et al. | ................... | 709/231 |
| 7,971,069 B2 * | 6/2011 | Yellepeddy | .................... | 713/189 |
| 8,059,814 B1 * | 11/2011 | Duane | .............................. | 380/45 |
| 8,285,878 B2 * | 10/2012 | Gladwin et al. | .............. | 709/246 |
| 2002/0091734 A1 * | 7/2002 | Redlich et al. | ................. | 707/511 |
| 2004/0156506 A1 * | 8/2004 | Sanchez | ........................ | 380/277 |
| 2005/0004924 A1 * | 1/2005 | Baldwin | ........................ | 707/100 |
| 2005/0080827 A1 * | 4/2005 | Percival et al. | ............... | 707/203 |
| 2005/0283620 A1 * | 12/2005 | Khulusi et al. | ................. | 713/185 |
| 2006/0126850 A1 * | 6/2006 | Dawson et al. | ............... | 380/284 |
| 2006/0212698 A1 * | 9/2006 | Peckover | ...................... | 713/151 |
| 2007/0101436 A1 * | 5/2007 | Redlich et al. | .................. | 726/27 |
| 2008/0040451 A1 * | 2/2008 | Manning | ........................ | 709/219 |

* cited by examiner

*Primary Examiner* — April Shan
*Assistant Examiner* — Eric W Shepperd

(57) ABSTRACT

An approach is provided for securely storing sensitive data. A system is provided that includes a central device configured to receive a key from a requester, to obtain a new key associated with the key, and to transmit the new key to the requestor, and a storage device for storing the new key in association with the key. Also, a secure system is provided that includes a parsing unit that parses an actual data value into a first data field and a second data field, a key generation unit that generates a key, a first process that transmits the key to a central manager and receives a new key associated with the key from the central manager, and at least one storage device configured to store the first data field in association with the key, and to store the second data field in association with the new key.

23 Claims, 21 Drawing Sheets

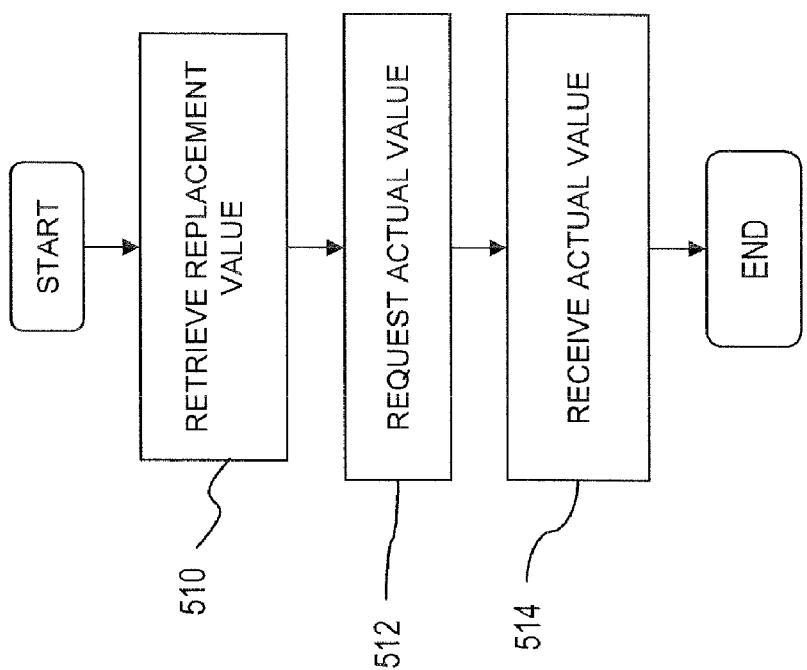

US 8,401,183 B2

METHOD AND SYSTEM FOR KEYING AND SECURELY STORING DATA

BACKGROUND INFORMATION

With the onset of public use of the Internet and the World Wide Web, secure handling of sensitive data has become a very important issue. Hackers have become very sophisticated in their techniques for accessing sensitive data stores. It has become more and more common for these hackers to steal and use for illegal purposes, such data stores, which can include private information such as social security numbers, driver's license numbers, calling card numbers, bank account numbers, and credit card numbers. Legislatures have responded to identity theft by enacting laws requiring businesses that store sensitive data to perform certain steps to ensure a particular level of integrity of the data. For example, a law may require a certain level of encryption or firewall protection, or the law may require that if data is compromised, a keeper of the data store so compromised may be required to inform all owners of the compromised data of the breach so that they may take appropriate steps such as informing credit bureaus to issue a fraud alert for their credit records, as well as monitoring their credit records for fraudulent activity.

A common method of storage of sensitive data involves encrypting the data and storing it in a database. Thus, data regarding a particular entity, such as a customer, is stored in common facilities. To access the data, a hacker need only figure out how to break in to the facility and how to decrypt the data, and the hacker would then have enough information to be able to make fraudulent use of the data. For example, if a hacker broke into a telecommunications client's database and managed to obtain a customer's identity and card number, the hacker might be able to fraudulently make thousands of dollars of calls using the information.

Therefore, there is a need for more secure storage of sensitive data.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 5a and 5b are flowcharts of, respectively, a process for requesting an actual value from a central encryption service, and a process for generating the actual value, in accordance with various exemplary embodiments;

DESCRIPTION OF THE PREFERRED EMBODIMENT

A preferred system, method, and software for a central encryption and storage manager are described. In the following description, for the purposes of explanation, numerous specific details are set forth in order to provide a thorough understanding of the present invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
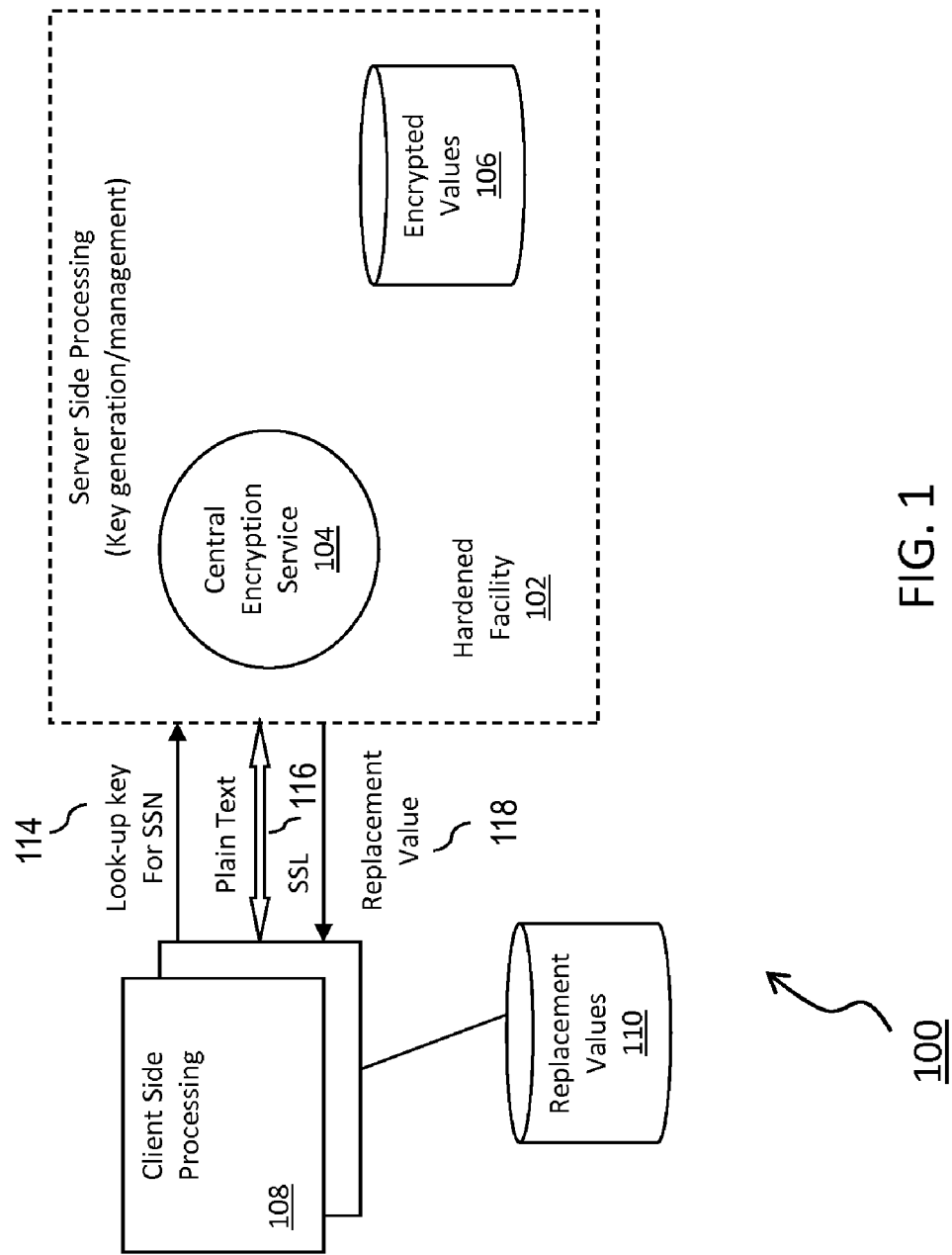
FIG. 1 depicts a networked system with an exemplary central encryption service for providing replacement values and storing actual values, according to an exemplary embodiment.

FIG. 1 depicts a networked system 100 with an exemplary central encryption service 104 for providing replacement values and storing actual values according to an exemplary embodiment. The depiction shown in FIG. 1 illustrates clients 108 or requesters requesting a replacement value 118 from the central encryption service 104 for an actual, sensitive data value, for example, by sending a look-up key value for a social security number (SSN) 114. The clients 108 may generally be any type of application, process, system, etc. that may need to store or process any type of sensitive data. Generally, the clients 108, or requesters, send a request 114 via a secure connection (e.g., Secure Sockets Layer (SSL)) 116 over a network to a separate hardened facility 102, which is responsible for generating and managing the replacement values and look-up key values, which may be used as an index for storing and retrieving the actual values. After verification of the requester, the central encryption service 104 produces a replacement value 118 for the received actual data value and encrypts the received actual data value. The replacement value 118 may be generated as a data value having the same data attributes as the received actual data value; for example, a nine-digit social security number may be assigned a nine-digit numeric replacement value which "looks like" a social security number, but is a meaningless value to potential hackers. For example, if an actual value of a social security number is "978990123" then a replacement value of "943001234" may be obtained as a replacement value to be used as the look-up key value for the actual, sensitive value "978990123". The replacement value is merely used as a placeholder value for the client 108 or requester to store and use to request the actual values by using the replacement value as a look-up key value. The clients 108 are generally separated from the hardened facility 102 such that the clients 108 may only retrieve an actual sensitive value by properly requesting the actual sensitive data value from the hardened facility 102 by providing the replacement value corresponding to the actual sensitive data value.

The replacement value 118 and the encrypted actual data value are then stored in an encrypted values storage 106. The two values may be stored as a replacement value 118 and encrypted value data pair that may be looked up by either of the two values. The replacement value 118 is then transmitted back to the clients 108, which may store the replacement value in a replacement values storage 110. The clients 108 may request replacement values for any number of different sensitive data fields such as: social security numbers, calling card numbers, bank account numbers, credit card numbers, driver license numbers, employee numbers, student account numbers, etc. One skilled in the art would recognize that sensitive data fields may include any type of data, such as numeric, alphabetic, special characters, etc. Each different sensitive data field, or portion thereof, for a particular customer may be assigned a different replacement value, thus adding complexity to the task of a hacker trying to compromise a customer's sensitive information. The encrypted actual data values are stored separately in the central hardened facility 102 in separate logical encrypted values storage 106, and thus even if a hacker accesses the hardened facility's media 106, they would only get meaningless data. One skilled in the art would recognize that these values may be stored in other ways than those described herein without deviating from the spirit or scope of the present invention. For example, instead of actually storing the replacement value 118 in the encrypted values storage 106, the replacement value may instead be used as an index, or look-up key value to store and retrieve the corresponding data value. Another indicator of an association, or correspondence between the actual data value and the replacement value, for example, may be stored in lieu of storing the pairs of values as well.

When the clients 108 need the actual data, for example, for billing, statistics, or other types of reporting, the clients 108 simply access the replacement value 118 from the replacement values storage 110 located at the clients' facilities and send the replacement value 118 with a request to the hardened facility 102, where the requester is authenticated. The replacement value 118 is then used to look up the actual data value in the encrypted values storage 106, the retrieved encrypted value is decrypted, and then sent back via a secure connection to the requester. The clients 108, thus advantageously, have no need to store actual sensitive data values at the clients' facilities. A hacker accessing the replacement values storage 110 would only retrieve data values that are meaningless to all but the hardened facility 102, which is a centralized repository physically and logically separated from the clients 108.

Figure 2:
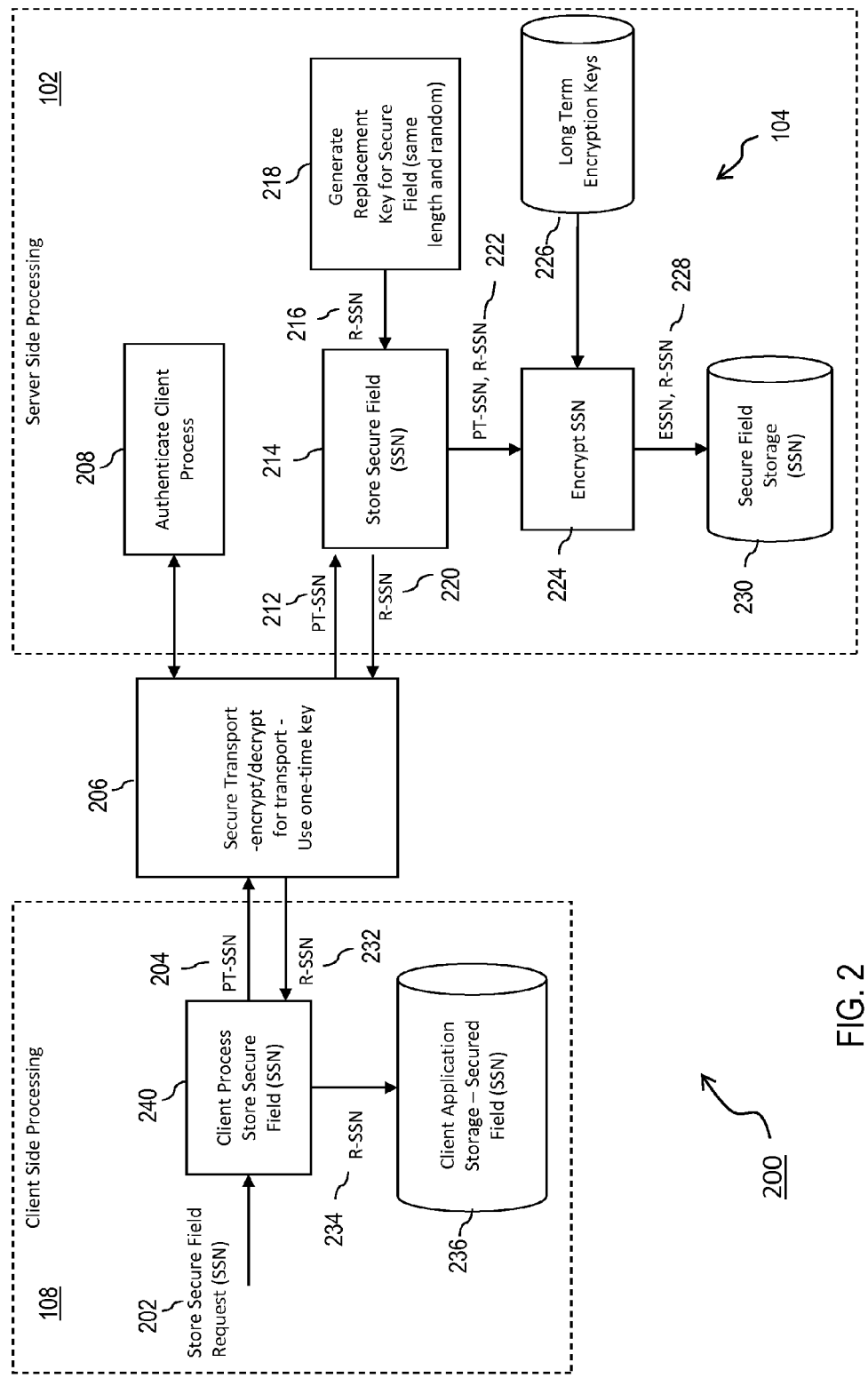
FIG. 2 depicts a networked system with an exemplary central encryption service for generating replacement values and storing encrypted actual data values for an exemplary requester such as a client, in accordance with an exemplary embodiment.
Figure 3A:
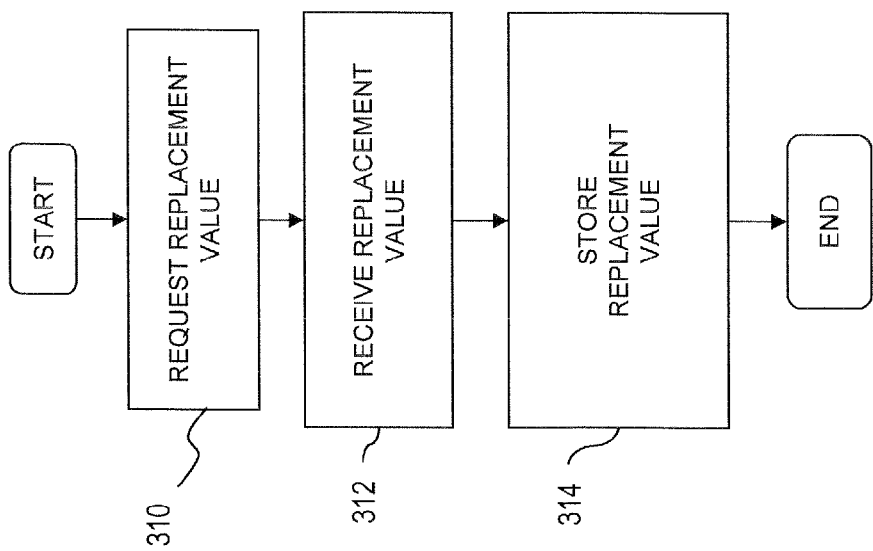
FIGS. 3a and 3b are flowcharts, respectively, of a process for requesting a replacement value from a central encryption service, and a process for generating the replacement value, in accordance with various exemplary embodiments.
Figure 3B:
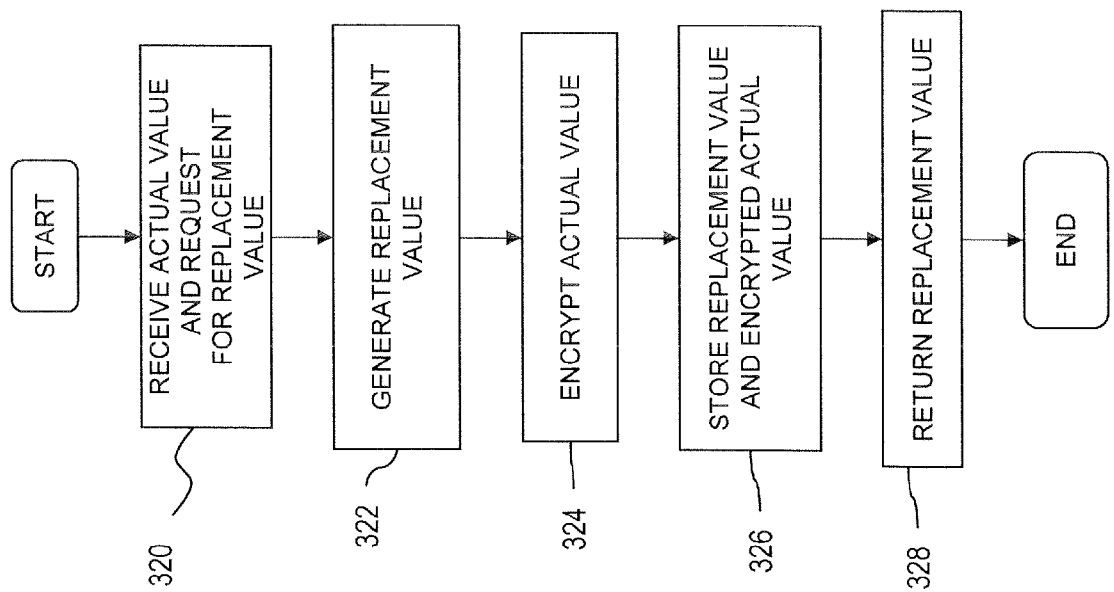

FIG. 2 depicts a networked system 200 supporting an exemplary central encryption service 104 for generating replacement values 118 and storing encrypted actual data values for an exemplary client 108. FIG. 3a is a flowchart depicting exemplary steps that may be performed by the exemplary client 108 requesting a replacement value from an exemplary central encryption service 104, while FIG. 3b is a flowchart depicting exemplary steps that may be performed by the exemplary central encryption service 104 providing the replacement value to the exemplary client 108 in accordance with an exemplary embodiment. The exemplary networked system 200 depicts the client 108 requesting secure storage 202 for a social security number (SSN) as a sensitive data value, although it is understood that any type of sensitive data may receive similar treatment using the concepts described herein. (Step 310) The client 108 generates a store secure field request (SSN) 202 which is received by a client process store secure field 240. The client process store secure field 240 sends a request with a plain text format of the SSN (PT-SSN) 204 for secure transport via a secure transport 206, which may transport the information via, for example, a SSL transport to the hardened facility 102. The hardened facility 102 receives the request and then authenticates the requester, for example, the hardened facility 102 authenticates 208 the client process which sent the data. (Step 320) If the requester is not authenticated, the hardened facility 102 may respond to the request with an "access denied" response.

If the requester is authenticated, then the central encryption service 104 receives the PT-SSN 212 to process the PT-SSN 212 via a store secure field 214 process. A replacement SSN (R-SSN) 216 is received from a generate replacement key for secure field 218 process. (Step 322) The replacement key value may be generated by a random number generator as a value having the same length and data type as the original actual data value (e.g., numeric, nine digit value for SSN), and may be unique for each actual data value. It is preferable that the replacement key value be unique for each actual data value. One skilled in the art of data processing would recognize that there are many ways to obtain or generate the replacement key values such that they have a relationship with the PT-SSN 212 that is not easily ascertainable to a potential hacker, without departing from the spirit and scope of the present invention. Further, the replacement key values may be generated in advance of the receipt of a request, or they may be generated upon request. The PT-SSN 212 and the R-SSN 222 are then received by encrypt SSN 224, which encrypts the PT-SSN 212 using an encryption technique of choice used by the hardened facility 102, by using long term encryption keys 226 maintained by the hardened facility 102. (Step 324) Advanced Encryption Standard (AES) may be used as an exemplary encryption technique. The encrypted SSN (ESSN) and the replacement SSN, as an ESSN, R-SSN pair 228, are then stored in a secure field storage 230 under the control of the hardened facility 102. (Step 326) The R-SSN is then sent as R-SSN 220 to the secure transport 206 (Step 328) for secure transport to the client process store secure field 240 via a securely transported R-SSN 232, (Step 312) for replacement of the original actual data value, and for storage as R-SSN 234 in a client application storage 236. (Step 314) The R-SSN stored by the client may then be used to request the actual data value from the hardened facility 102 when needed.

Figure 4:
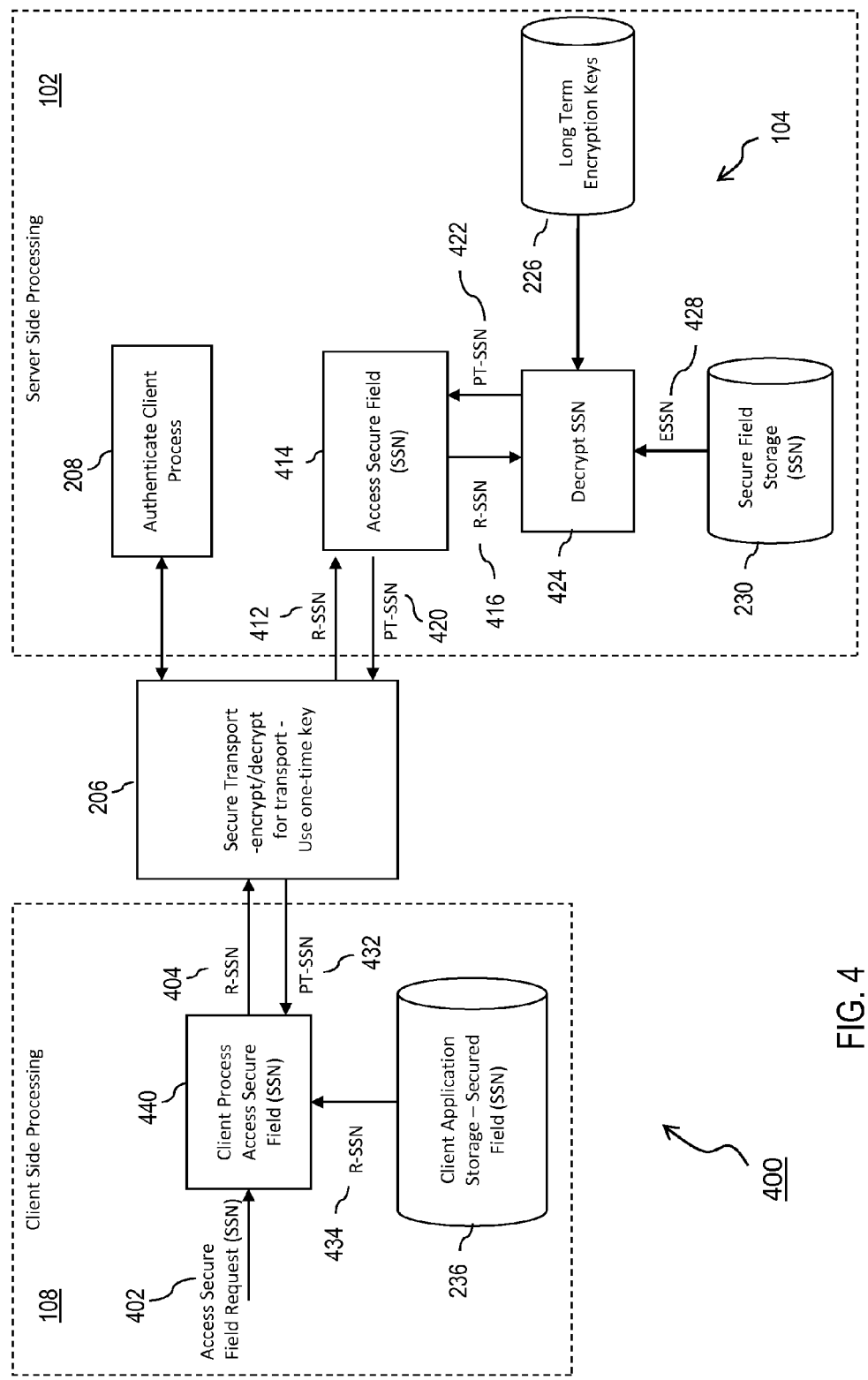
FIG. 4 depicts a networked system with an exemplary central encryption service for retrieving stored actual values, according to an exemplary embodiment.
Figure 5B:
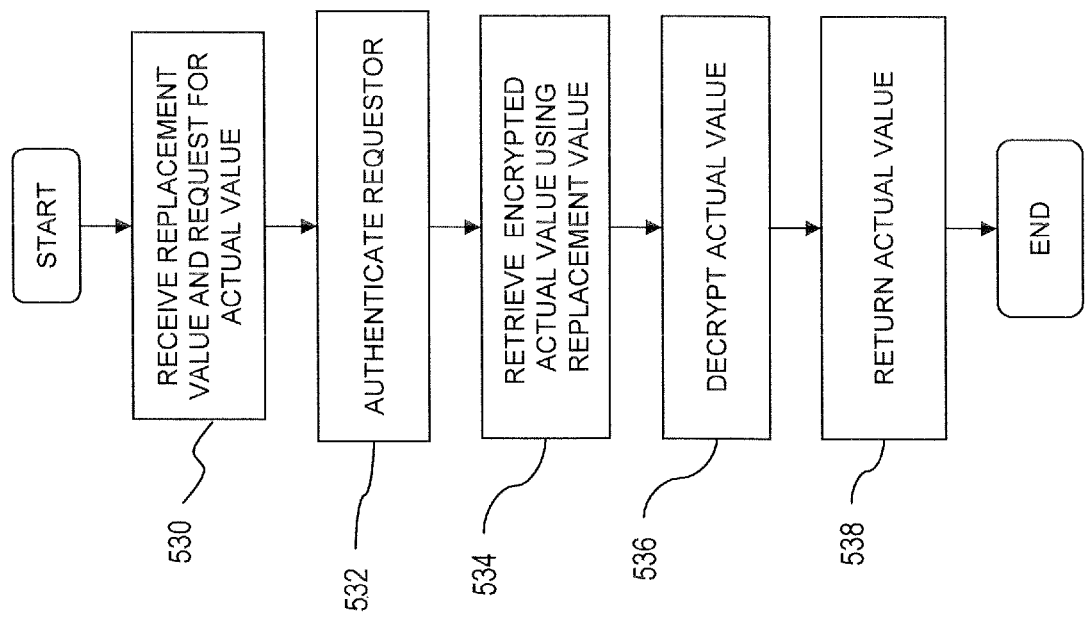

FIG. 4 depicts a networked system with an exemplary central encryption service 104 for retrieving stored actual values for an exemplary client 108. Meanwhile, FIG. 5a is a flowchart depicting exemplary steps that may be performed by the exemplary client 108 requesting an actual value from the exemplary central encryption service 104, and FIG. 5b is a flowchart depicting exemplary steps that may be performed by the exemplary central encryption service 104 providing the requested actual value to the exemplary client 108 according to an exemplary embodiment. The exemplary networked system 400 depicts the client 108 requesting access 402 to a securely stored actual data value, for example, a social security number (SSN), although it is understood that any type of sensitive data may receive similar treatment using the concepts described herein. A client process access secure field 440 requests and receives a replacement value, for example, R-SSN 434 from the client application storage 236. (Step 510). The client process access secure field 440 then sends a request for the securely stored actual data value, with a plain text format of the R-SSN 404, for secure transport via the secure transport 206, which may transport the information via, for example, a SSL transport to the hardened facility 102. (Step 512) The hardened facility 102 receives the request (Step 530) and then authenticates the requester, for example, the hardened facility 102 authenticates 208 the client process which sent the request. (Step 532) If the requester is not authenticated, the hardened facility 102 may respond to the request with an "access denied" response.

If the requestor is authenticated, then the central encryption service 104 receives the R-SSN 412 to process the plain text R-SSN 412 via an access secure field 414 process. The R-SSN 416 is then received by decrypt SSN 424, which retrieves the ESSN 428, from the secure field storage 230, for example, by using the R-SSN 416 as a look-up value. (Step 534) The decrypt SSN 424 decrypts the ESSN 428 using a decryption technique of choice used by the hardened facility 102, by using long term encryption keys 226 maintained by the hardened facility 102 which were used to encrypt the ESSN. (Step 536) The decrypted actual value of the SSN is then sent as a PT-SSN 422 to the access secure field 414. The access secure field 414 then forwards the PT-SSN 420 to the secure transport 206 (Step 538) for secure transport to the client process access secure field 440 via a securely transported PT-SSN 432, (Step 514) for use by the requestor via client 108.

This technique advantageously avoids any need for the clients 108 to store sensitive data in their own storage facilities, thus relieving the clients from the tasks of determining how to encrypt and store their sensitive data as hackers become more and more sophisticated, and as laws are passed requiring more and more security.

Figure 6:
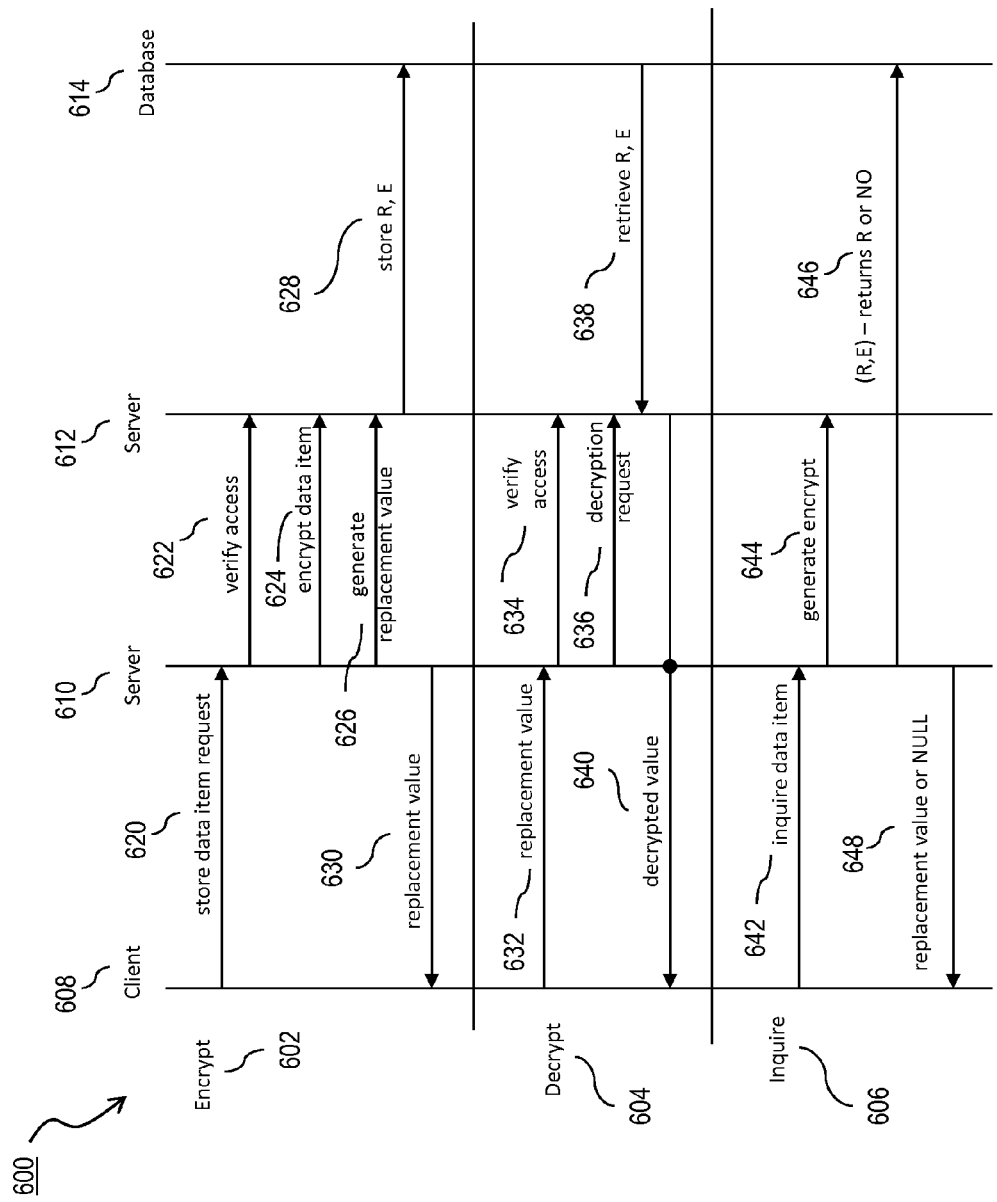
FIG. 6 depicts an exemplary system flow diagram illustrating data flow between an exemplary client and an exemplary central encryption service in accordance with an exemplary embodiment.

FIG. 6 depicts an exemplary system flow diagram 600 illustrating a data flow between an exemplary client 608 or requester and an exemplary central encryption service 104 in accordance with an exemplary embodiment. The exemplary system flow diagram 600 illustrates flows of data for each of three client application program interfaces (APIs) for encrypt 602, decrypt 604, and inquire 606. Each of these APIs may be supported, for example, by extensible markup language (XML) implementations. Further, a connect API may be used to connect the client application to the security infrastructure to validate roles and access levels of the requester client 608. A disconnect API may also be utilized to disconnect the client 608.

For the purposes of explanation, the dataflow of the exemplary encrypt API 602 is explained with respect to the system of FIG. 2. In accordance with the exemplary encrypt API 602, the client 608 sends a request 620 to store a data item to a server 610, via the client process store secure field 240, which may send a request with a plain text format of the data item such as the PT-SSN 204. Once a secure connection, for example, an SSL connection via the secure transport 206, is established and a connect API returns success, the encrypt API 602 can be called. In step 622, the server 610 then verifies access rights of the requestor via a server 612, for example, via the authenticate client process 208, and in step 624 requests encryption of the data item, for example, via the encrypt SSN 224. The server 612 receives a generated replacement value 626 for the data item, and in step 628 stores the replacement value and the encrypted data value as a data pair R,E, for example, ESSN, R-SSN 228, in a database 614 such as secure field storage 230, which is under the control of the central encryption service 104. In step 630, the replacement value such as R-SSN 220 is then returned to the client 608 via the secure transport 206 and the client process store secure field 240 for storage in the client's storage media 236. When the client needs the actual value, for example, for viewing, billing or reporting, the decrypt API 604 may be called to retrieve the actual data value from the database 614.

For the purposes of explanation, the dataflow of the exemplary decrypt API 604 and the exemplary inquire API 606 are explained with respect to the system of FIG. 4. In accordance with the exemplary decrypt API 604, the client 608 sends a request 632 to retrieve a data item to the server 610 by sending the replacement value of the data item with the request 632, for example, via the client process access secure field 440, which may send a request with a plain text format of the replacement value associated with the data item such as the R-SSN 404. Once a secure connection, for example, an SSL connection via the secure transport 206, is established and a connect API returns success, the decrypt API 604 can be called. In step 634, the server 610 then verifies access rights of the requester via the server 612, via the authenticate client process 208, and in step 636 requests decryption of the data item that is associated with the received replacement value such as R-SSN 412, for example, via the decrypt SSN 424. In step 638, the server 612 retrieves the encrypted data value, for example, the ESSN 428 from the database 614 such as the secure field storage 230 using the replacement value, for example, the R-SSN 416 for the data item. The encrypted data value is then decrypted and in step 640 the decrypted value, for example, PT-SSN 420 is then returned to the client 608, via the secure transport 206 and the client access secure field 440, for use by the client 608.

In accordance with the exemplary inquire API 606, the client 606 sends a request 642 to the server 610 to inquire about the existence in the database 614 of a particular data item by sending the value of the data item with the request 642, via a client process which may send a request with a plain text format of the data item such as the PT-SSN 204. In step 644, the server 610, in conjunction with server 612, generates an encrypted version of the data item, for example, via the encrypt SSN 224 and the long term encryption keys 226. Additionally, in step 646, the server 610 searches the database 614 such as the secure field storage 230 for the encrypted data value. The search returns a value of a replacement value for the encrypted data value if the data item is stored in the database 614, or a value indicating that the encrypted value was not found, for example, a value of NULL. In step 648, the replacement value or NULL is then returned to the client 608.

Figure 7:
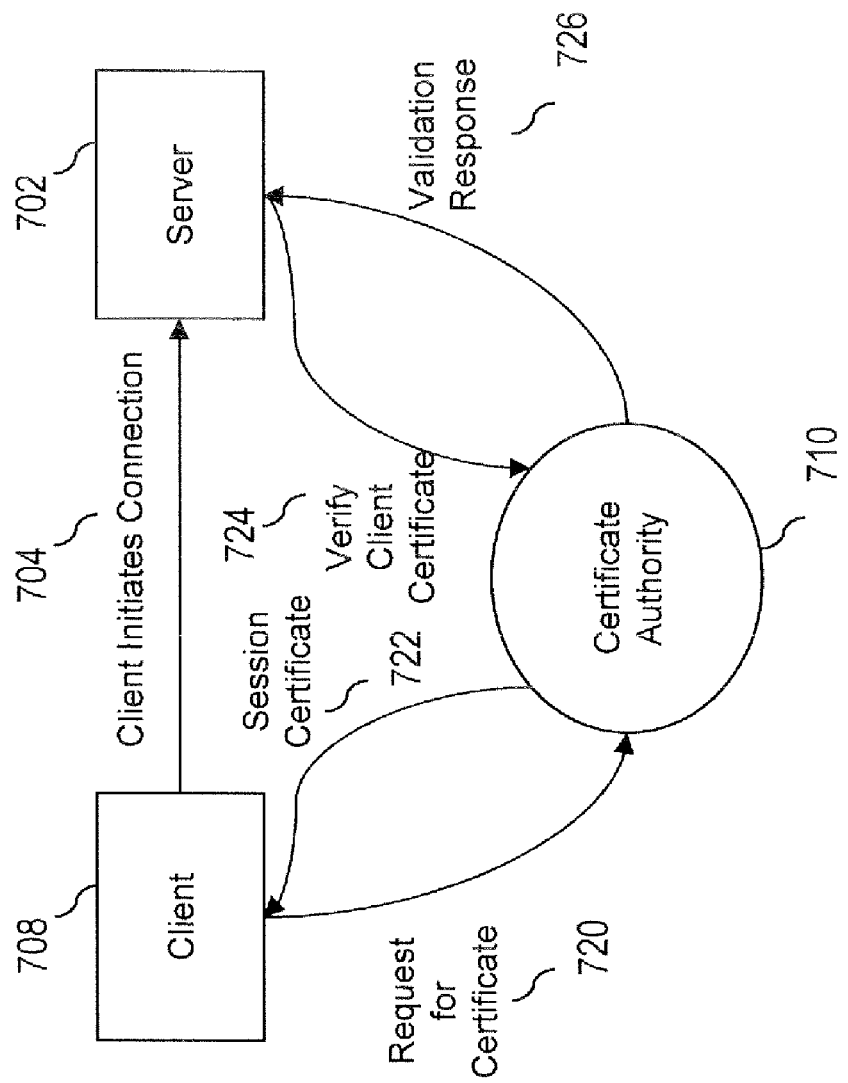
FIG. 7 depicts an exemplary system flow diagram illustrating data flow between an exemplary client and an exemplary server service providing secure communication in accordance with an exemplary embodiment.

FIG. 7 depicts an exemplary system flow diagram illustrating data flow between an exemplary client 708 and an exemplary server service 702 providing secure communication in accordance with an exemplary embodiment. Data transferred between the client 708 and the server service 702 is preferably encrypted for transport, for example, by use of secure transport services such as SSL. It may also utilize server side authentication of client processes with legitimate need to store or retrieve select critical fields (e.g., SSN, driver license number, card numbers, etc). The client may also authenticate the server via certification, for example, to ensure that the client is connected to a valid server.

SSL involves the use of strong encryption of all transmitted data using a combination of publicly held keys to encrypt the data and privately held keys which are used by the receiving system to decrypt the data. These keys are exchanged via a trusted sourced which is known as a certificate server. Through a trusted relationship that is established between the client, server, and the certificate server, the client and server can be assured that each entity is the actual entity indicated by a particular transmission, and that the data stream will maintain a high level of privacy and integrity.

The exemplary technique described herein may, for example, be used to authenticate a requester of data from the hardened facility 102 as described above, for example, with regard to the authenticate client process 208. A client 708 sends a request for a certificate 720 to a trusted certificate authority 710, which returns a session certificate 722 to the client 708. As the client initiates the connection 704, the underlying mechanics of SSL may obtain a digital certificate in order to successfully establish a communications pipe. This certificate is obtained from a certificate authority site 710, which is a trusted third party server. The digital certificates are electronic files that are used to identify people and resources over networks such as the Internet. Digital certificates also enable secure, confidential communication between two parties using encryption. The certificate performs two functions: 1) it identifies a client (individual or application) as a trusted known entity; and 2) it provides the client with the certificate which will be used to exchange information with the server.

Once the digital certificate is obtained, the SSL protocol uses it to create a secure, confidential communications "pipe" between two entities. Data transmitted over an SSL connection cannot be tampered with or forged without the two parties becoming immediately aware of the tampering. Digital certificates are based on public-key cryptography, which uses a pair of keys for encryption and decryption. With public-key cryptography, keys work in pairs of matched "public" and "private" keys. The public key is used by the client to encrypt the data passed to the server. Only the server knows how to decrypt the message using its private key. When it is time for the server to respond, it uses the client's public key to encrypt the reply. Only the client will be able to decrypt this message using its own privately held key.

The client initiates 704 a connection with the server 702. In order to authenticate the requestor client 708, the server 702 sends a request 724 to verify the client certificate. The trusted certificate authority 710 then sends a validation response 726 to the server 702 after determining the validity of the client request to the server 702. While this discussion focuses on an exemplary use of SSL, one skilled in the art of data processing will understand that any secure transport technique may be used without departing from the spirit and scope of the present invention.

Figure 8:
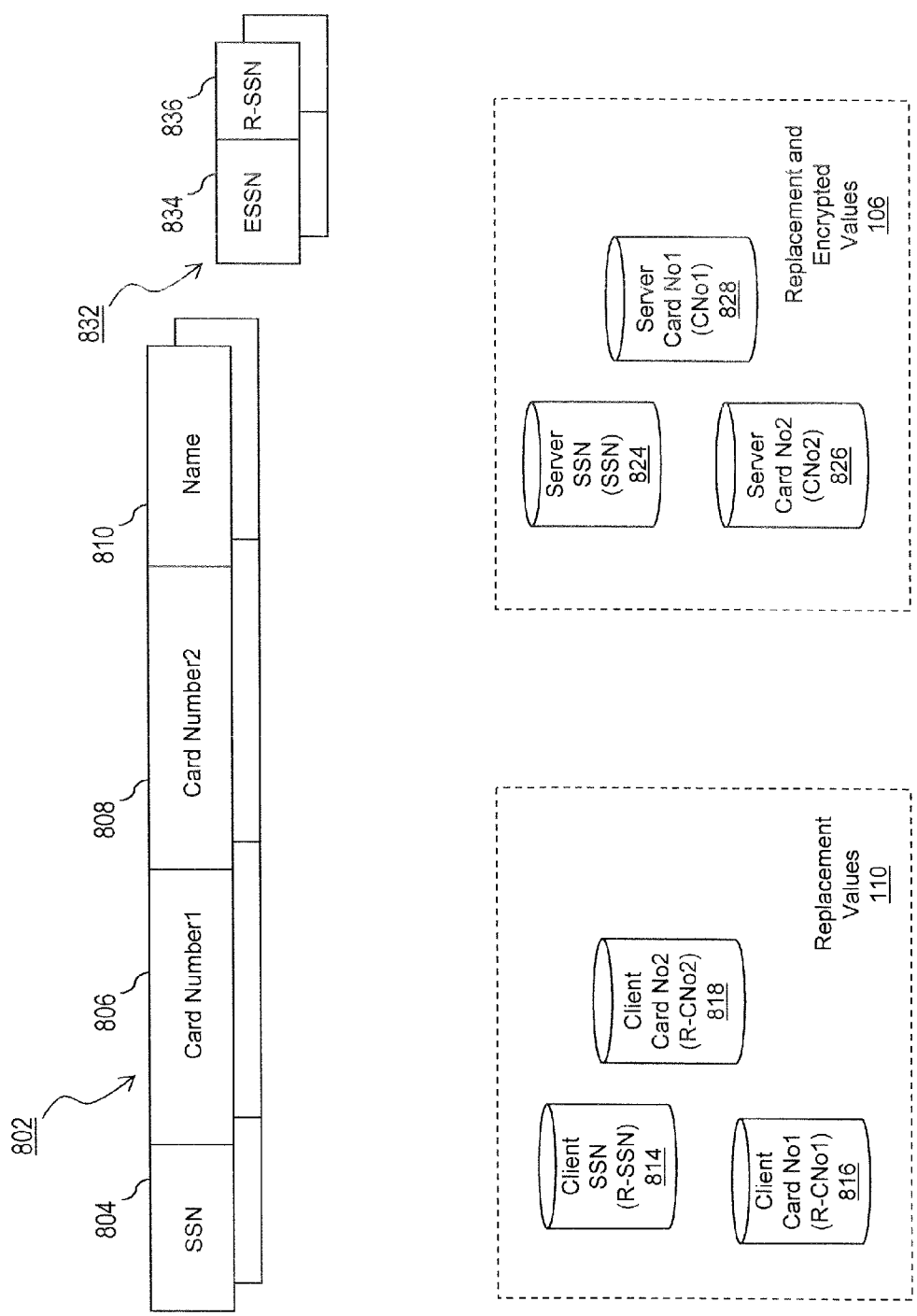
FIG. 8 depicts an exemplary customer record for an exemplary client system and exemplary storage for the client system and an exemplary central encryption service in accordance with an exemplary embodiment.

FIG. 8 depicts an exemplary customer record 802 for an exemplary client system. FIG. 8 also depicts an exemplary value pair 832 comprising encrypted value (ESSN) 834 and replacement value (R-SSN) 836 for an exemplary central encryption service. Further, FIG. 8 depicts exemplary storage for replacement values storage 110 for the client system and for encrypted values storage 106 for the exemplary central encryption service in accordance with an exemplary embodiment. The value pair 832 depicts, specifically for an exemplary social security number (SSN) field, a logical view of the data managed by the central encryption service. For example, the central encryption service may store an indicator of the association or relationship between the encrypted value 834 and the replacement value 836 in the encrypted values storage 106. The replacement value 836 may be used as an index to store or retrieve the encrypted value 834, or the pair may be stored as a data pair. One skilled in the art will recognize that there are many different ways, additional to those enumerated herein, for storing such an indicator without departing from the spirit or scope of the present invention.

The customer record 802 depicts a logical view of a customer's information including a social security number (SSN) 804, a "card number1" 806, a "card number2" 808, and a customer name 810. The SSN field is typically a nine digit numeric field, and card numbers may be any length and any data type; for example, a calling card number may be ten digits, a credit card number may be sixteen digits, and a driver license number may be any length and include any combination of digits, letters, or other characters.

The actual data from sensitive data fields may be stripped from the logical customer record 802 such that, for example, the actual SSN value 804 may be encrypted and stored in the encrypted values storage 106 for "server SSN" 824 storage for the exemplary central encryption service. Only the replacement value for the SSN value 804 is stored in the replacement values storage 110, in a "client SSN" 814 storage medium on the client side. Similarly, the actual "card number1" value 806 and the "card number2" value 808 may be separately encrypted and stored in respective storage media "server card no1" 828 and "server card no2" 826, with the respective replacement values for these fields stored respectively in "client card no1" storage 816 and "client card no2" storage 818. Information regarding multiple data fields may be sent in one transmission between the clients 108 and the hardened facility 102.

An advantage of separating out the various fields of the logical customer record 802 lies in the difficulty posed to a potential hacker in his/her attempt to decipher meaning out of the data stored in the client's storage media and the data stored in the server's storage media. To one not privy to the exact technique used to produce the replacement values, each of the separate storage media of the client merely contain meaningless strings of data that are only useful in requesting a lookup from the server. Furthermore, the encrypted data stored in the separate storage media 824, 826, and 828 on the server side, while each contains encrypted sensitive data, none of the data is theoretically useful to a hacker, as, for example, a social security number, driver license number, or card number is potentially useless without further information, such as a corresponding name.

An advantage of separating the encryption from the client to the central encryption service 104 is that the clients 108 do not have to worry about keeping up with the technology of encrypted storage or key management. The central encryption service 104 may keep track of its own encryption keys used for encrypting the stored actual data values, and may periodically decrypt and re-encrypt the stored values periodically, for example, as stronger encryption is deemed desirable, with the encryption process completely unknown and invisible to the clients 108. As long as client systems do not store the actual data values in any type of temporary files or other long-term storage, the actual values are very secure. The client systems may communicate replacement values for data fields among other client systems, such that the actual values will only be accessed from the hardened facility when needed.

Further, different data fields may need varying levels of access security. For example, a supervisor may need access to employee numbers of his/her working group, but may not need access to the driver license numbers of those employees, while a human resources administrator may need access to the driver license numbers of the employees. All of these considerations may be included in the client applications and the applications of the central encryption service to enable appropriate access only to those who are entitled.

The system described herein may easily support redundancy, high efficiency, and operational reliability with hardened security. Batch and/or online interfaces may be utilized. The system described herein is easily extended to track use scenarios, for example, use statistics and audits.

The exemplary embodiments depicted in FIGS. 9a-9c, 10a-10c, 11a-11b, and 12a-12b are particularly well-suited for situations where large data is being stored, and where the encryption of such large data would place a large burden on the system. These exemplary embodiments are particularly well-suited for situations where data can be parsed into various (two or more) data fields, and where the data fields when separated are not individually sensitive, but rather are sensitive only when the data fields are combined. For example, regarding health care data, by separating the patient's name into a first data field and the patient's medical record into a second data field, then each of these data fields are not sensitive when separated, but are sensitive when combined. Since the encryption and storage of both combined data fields (especially, the patient's medical record, which would be quite lengthy) would place a large burden on the system and would render each of these data fields inaccessible to all but a few employees of the client that have access to secure data.

Thus, the exemplary embodiments depicted in FIGS. 9a-9c, 10a-10c, 11a-11b, and 12a-12b provide secure storage of a key that is used to correlate the various data fields to one another. These exemplary embodiments can provide security to data without the need to encrypt the data fields. Thus, the separated data fields can be stored in plain text format, thereby reducing the encryption burden on the system. Additionally, these embodiments can also allow open, unrestricted access to the parsed data fields, since each field individually is not sensitive. Therefore, these embodiments reduce the burden on the system and allow greater access to data.

Figure 9A:
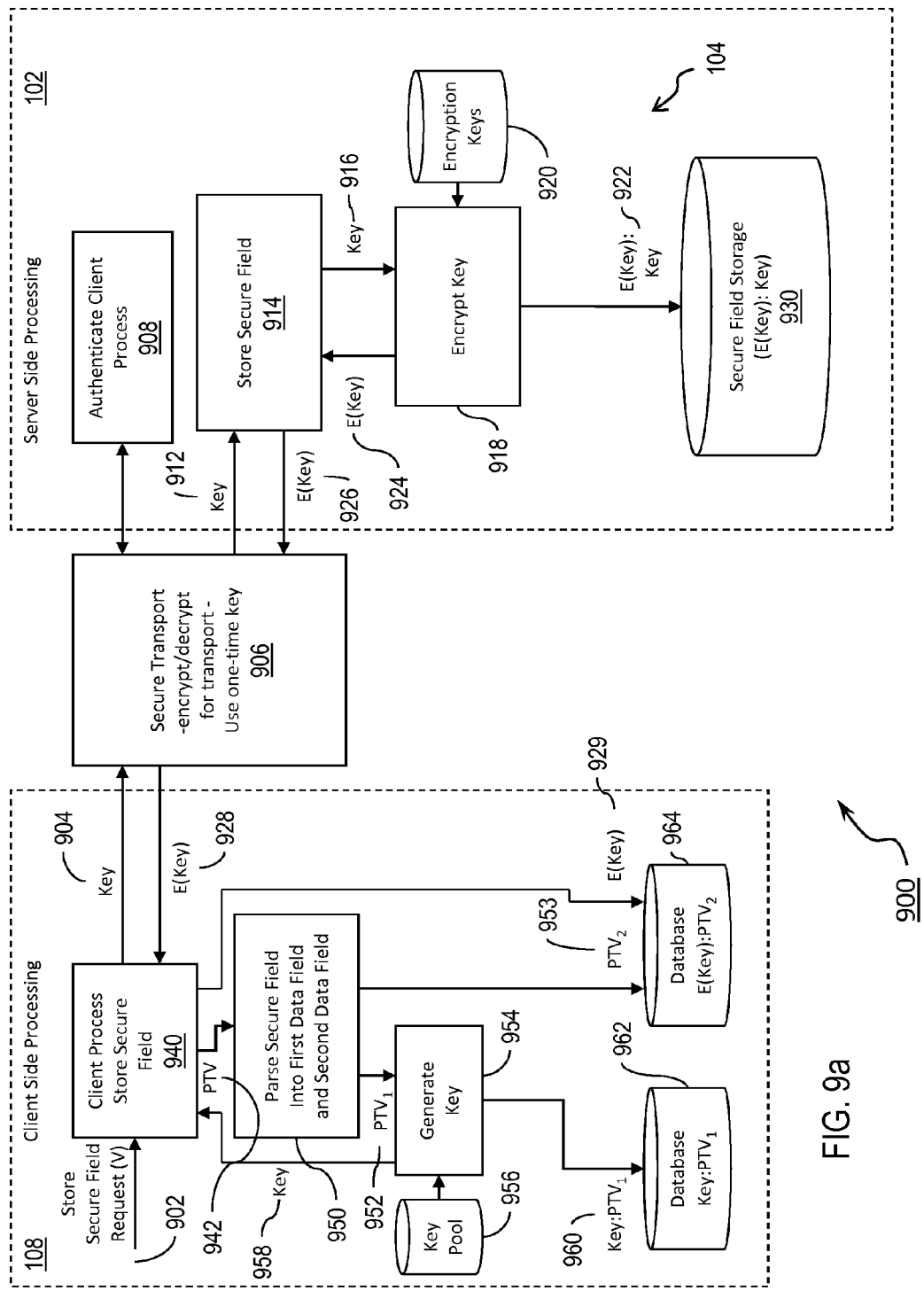
FIG. 9a depicts a networked system with an exemplary central encryption service for securely storing data for an exemplary requestor such as a client in accordance with an exemplary embodiment.
Figure 9B:
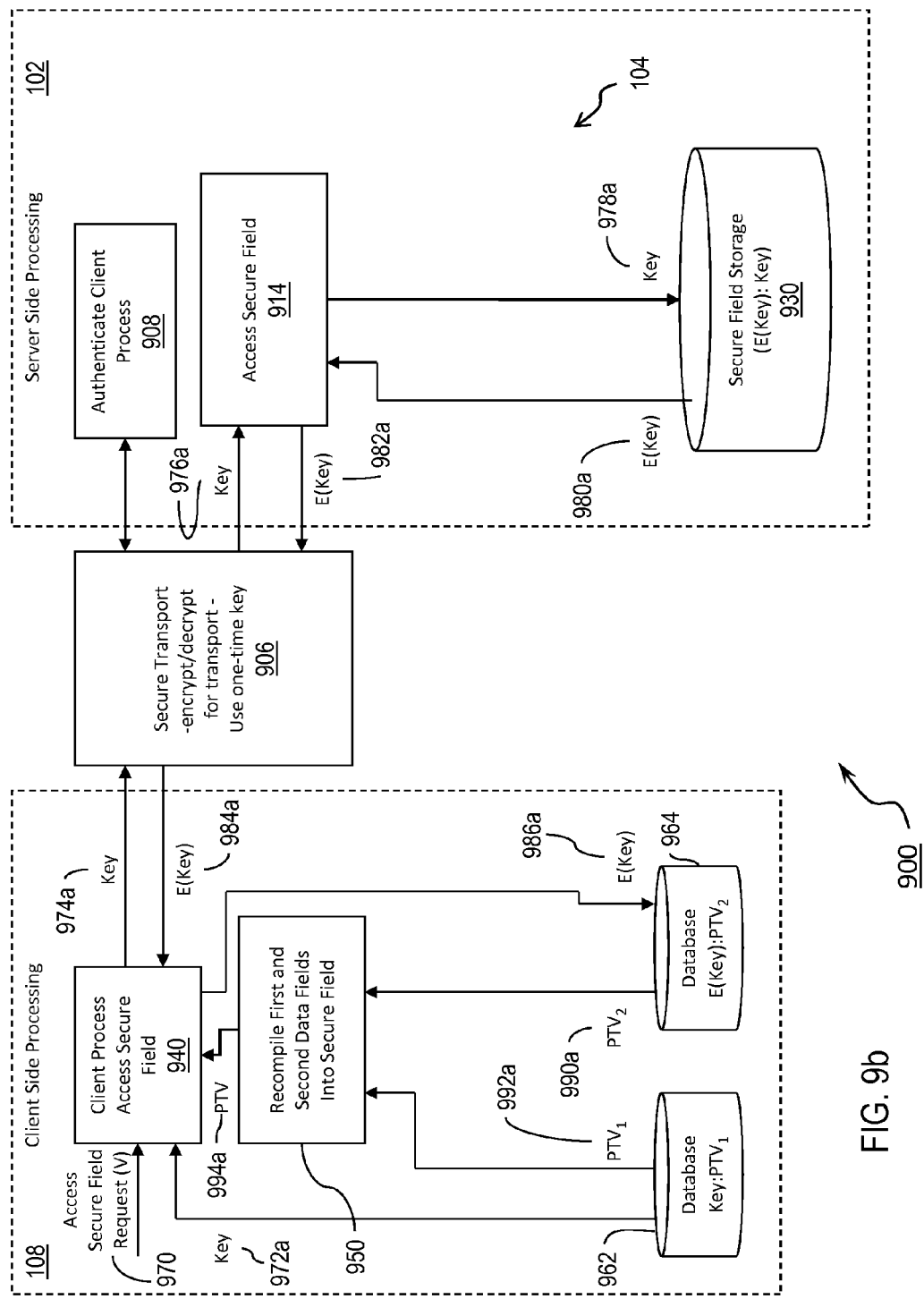
FIG. 9b depicts the networked system of FIG. 9a used to retrieve stored data according to an exemplary embodiment.
Figure 9C:
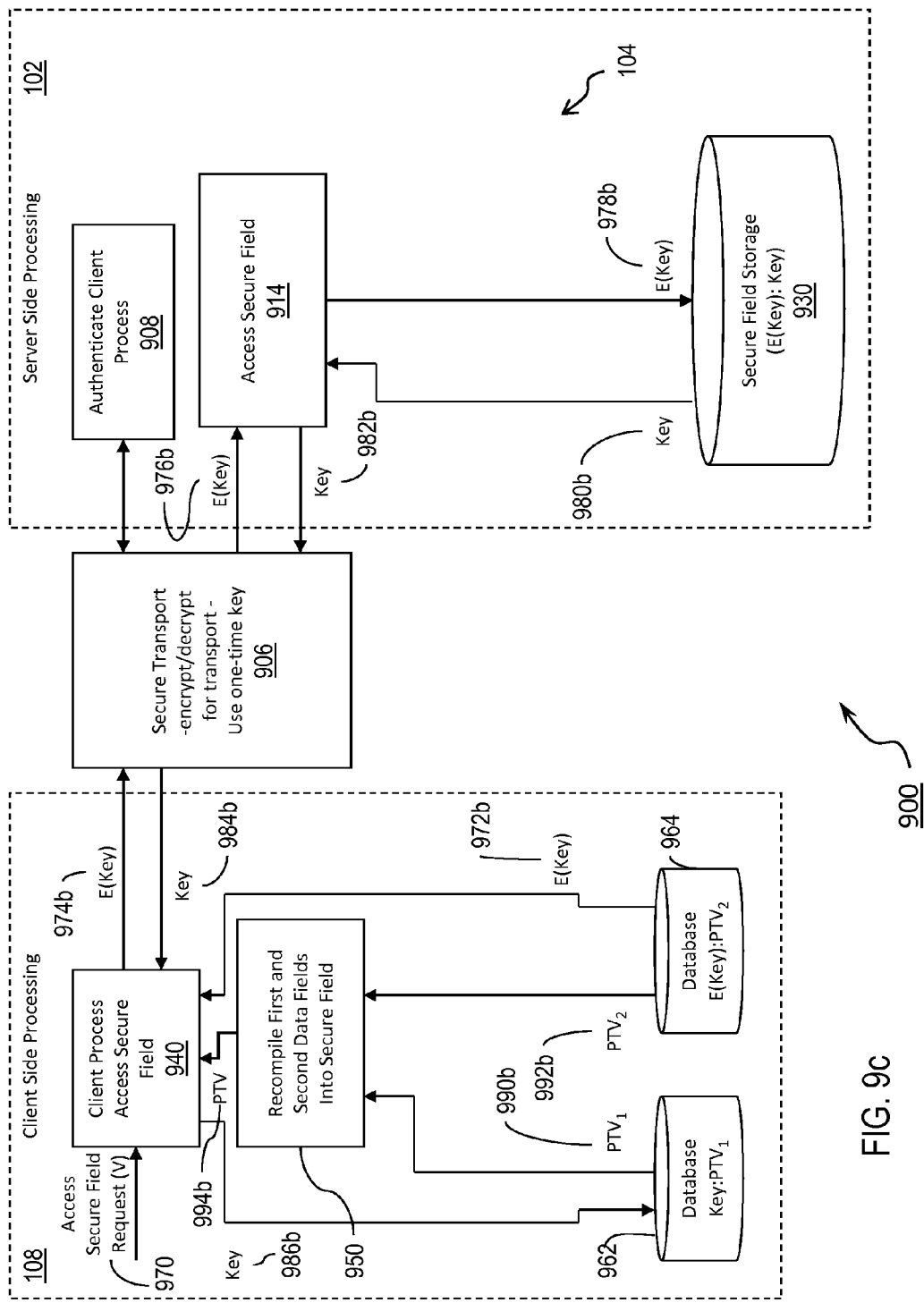
FIG. 9c depicts the networked system of FIG. 9a used to retrieve stored data according to another exemplary embodiment.

FIG. 9a depicts a networked system 900 with an exemplary central encryption service for securely storing data for an exemplary requester such as a client in accordance with an exemplary embodiment, FIG. 9b depicts the networked system of FIG. 9a used to retrieve stored data according to an exemplary embodiment, and FIG. 9c depicts the networked system of FIG. 9a used to retrieve stored data according to another exemplary embodiment.

The exemplary networked system 900 depicts the client requesting secure storage 902 for a sensitive data value. The client generates a store secure field request 902 which is received by a client process store secure field 940. The client process store secure field 940 sends a plain text format 942 of the sensitive data value to a unit 950 to parse the plain text value into a first data field 952 and a second data field 953, for example, one data field could include an individuals name, while the other data field includes the individual's medical records. Then, a key is generated at 954 using a key pool 956, and the first data field and the key 960 are sent to a database 962 to be stored in conjunction with one another. The database 962 is preferably openly accessible to employees of the client.

The key generated at 954 is also sent to the client process store secure field 940 at 958, and then the client process store secure field 940 sends a storage request with the key 904 for secure transport via a secure transport 906, which may transport the information via, for example, a SSL transport to the hardened facility 102. The hardened facility 102 receives the request and then authenticates the requester, for example, the hardened facility 102 authenticates 908 the client process which sent the data. If the requestor is not authenticated, the hardened facility 102 may respond to the request with an "access denied" response.

If the requestor is authenticated, then the central encryption service receives the key 912 to process the key via a store secure field 914 process. The key 916 is sent to an encryption device 918 that uses encryption keys 920 to encrypt the key. The encrypted key and the key 922 are sent to a secure field storage 930 where the encrypted key and the key are stored in conjunction with one another for later retrieval by the client. The encrypted key 924 is sent back to the store secure field 914 and then sent as encrypted key 926 to the secure transport 906 for secure transport to the client process store secure field 940 via a securely transported encrypted key 928. Then, the encrypted key 929 and the second data field 953 are sent to a database 964 to be stored in conjunction with one another. The database 964 is preferably openly accessible to employees of the client. The key stored in database 962 can then be used to request the corresponding encrypted key from the hardened facility 102 when needed, as shown in FIG. 9b, or the encrypted key stored in database 964 can then be used to request the corresponding key from the hardened facility 102 when needed, as shown in FIG. 9c.

As depicted in FIG. 9b, the client initiates an access secure field request 970 to obtain the original secure field data value. The client process access secure field 940 retrieves the appropriate key 972a from database 962, and sends the access request with the key 974a for secure transport via a secure transport 906, which may transport the information via, for example, a SSL transport to the hardened facility 102. The hardened facility 102 receives the request and then authenticates the requester, for example, the hardened facility 102 authenticates 908 the client process which sent the data. If the requester is not authenticated, the hardened facility 102 may respond to the request with an "access denied" response.

If the requestor is authenticated, then the central encryption service receives the key 976a to process the key via the access secure field 914 process. The key 978a is sent to the secure field storage 930 to retrieve the corresponding encrypted key 980a, which is sent back to the access secure field 914 and then sent as encrypted key 982a to the secure transport 906 for secure transport to the client process access secure field 940 via a securely transported encrypted key 984a. Then, the encrypted key 986a is sent to the database 964 to retrieve the corresponding second data field 990a. The second data field 990a from database 964, and the first data field 992a from database 962 corresponding to the key are sent to unit 950, where they are recompiled into a secure field as a plain text value 994a, and then sent back to the client process access secure field 940.

Alternatively, FIG. 9c depicts a situation where the encrypted key is used to request retrieval of the key. In FIG.

9c, the client initiates an access secure field request 970 to obtain the original secure field data value. The client process access secure field 940 retrieves the appropriate encrypted key 972b from database 964, and sends the access request with the encrypted key 974b for secure transport via a secure transport 906, which may transport the information via, for example, a SSL transport to the hardened facility 102. The hardened facility 102 receives the request and then authenticates the requester, for example, the hardened facility 102 authenticates 908 the client process which sent the data. If the requestor is not authenticated, the hardened facility 102 may respond to the request with an "access denied" response.

If the requestor is authenticated, then the central encryption service receives the encrypted key 976b to process the encrypted key via the access secure field 914 process. The encrypted key 978b is sent to the secure field storage 930 to retrieve the corresponding key 980b, which is sent back to the access secure field 914 and then sent as key 982b to the secure transport 906 for secure transport to the client process access secure field 940 via a securely transported key 984b. Then, the key 986b is sent to the database 962 to retrieve the corresponding first data field 990b. The first data field 990b from database 962, and the second data field 992b from database 964 corresponding to the encrypted key are sent to unit 950, where they are recompiled into a secure field as a plain text value 994b, and then sent back to the client process access secure field 940.

Figure 10A:
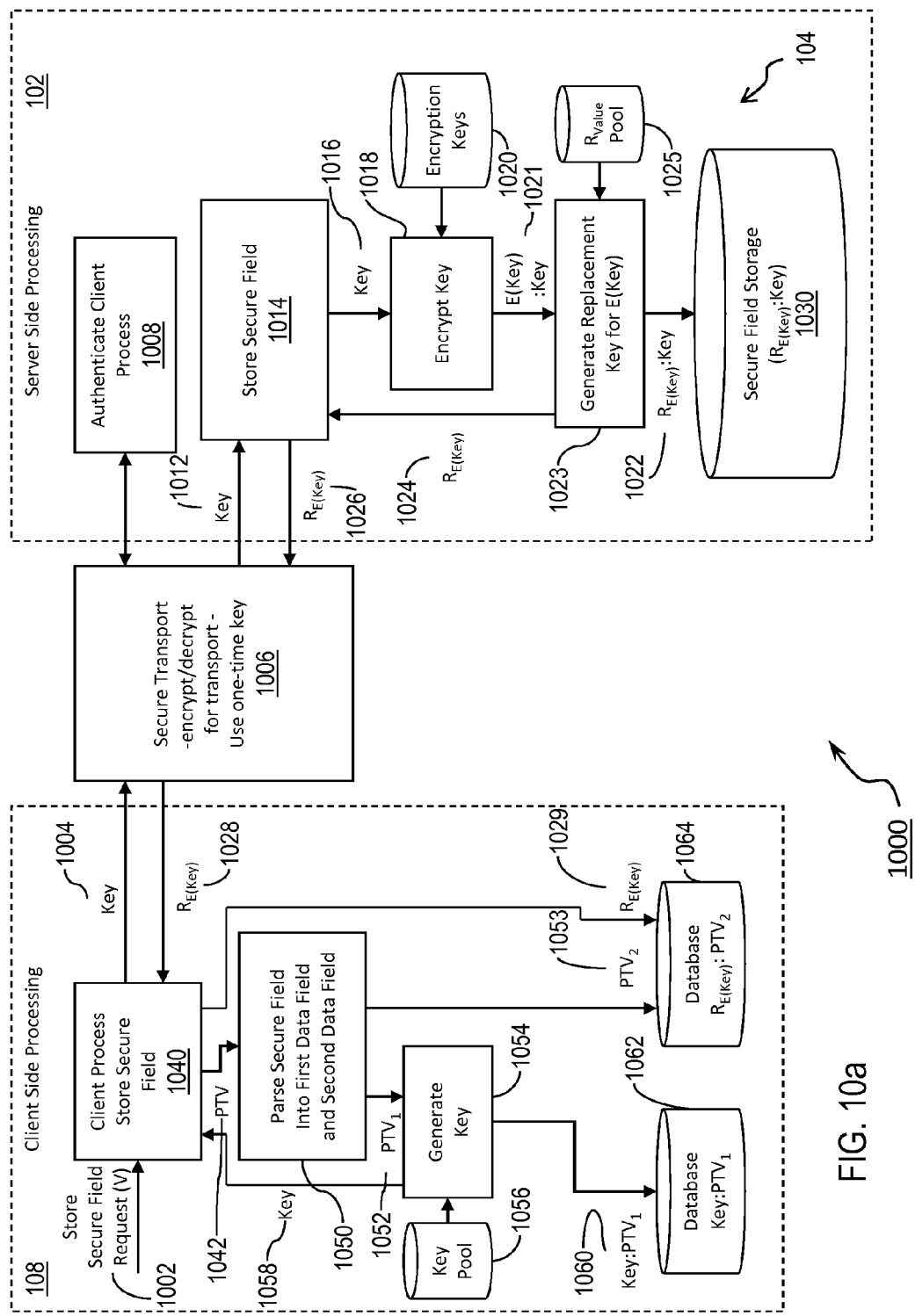
FIG. 10a depicts a networked system with an exemplary central encryption service for securely storing data for an exemplary requester such as a client in accordance with an exemplary embodiment.
Figure 10B:
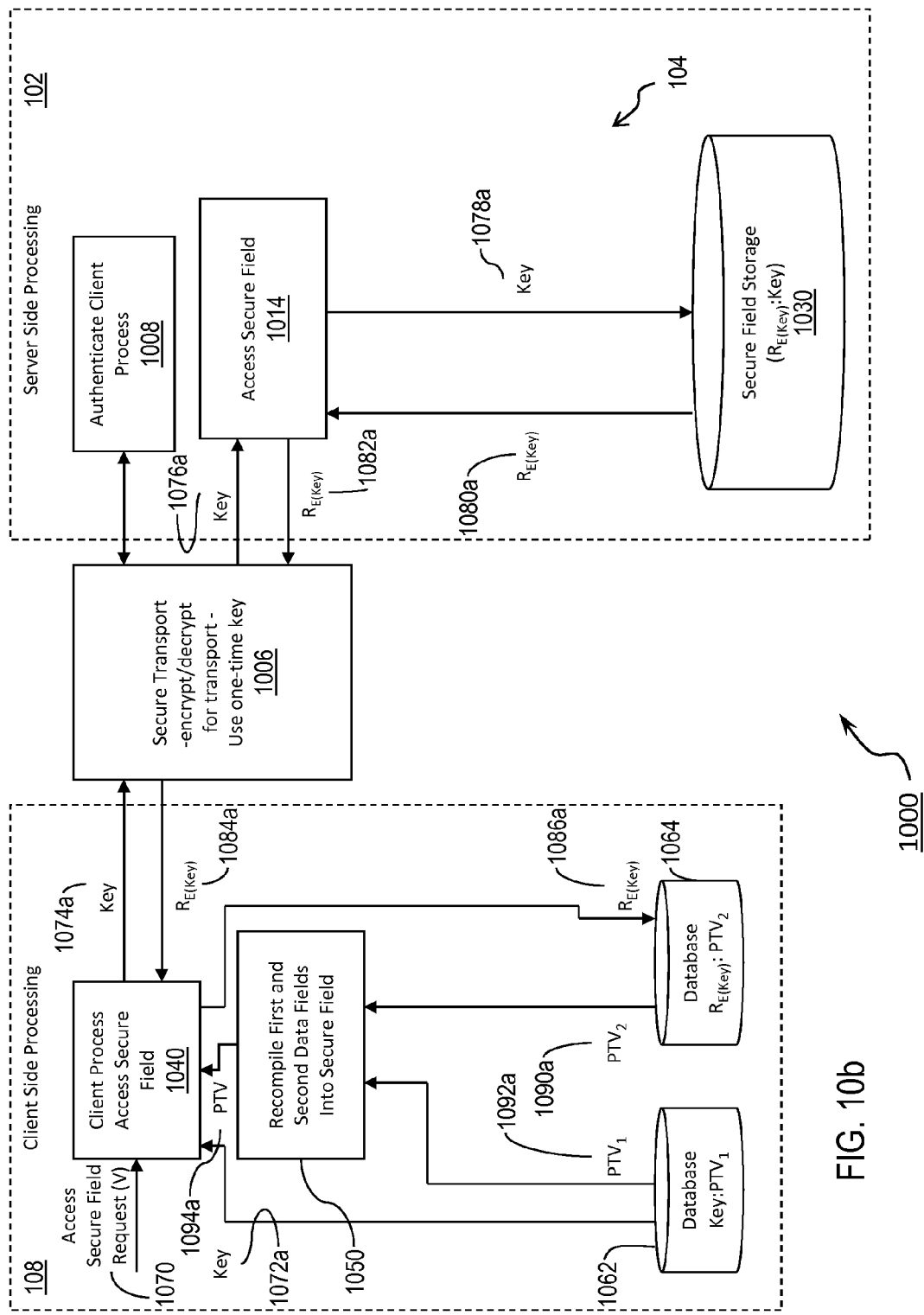
FIG. 10b depicts the networked system of FIG. 10a used to retrieve stored data according to an exemplary embodiment.
Figure 10C:
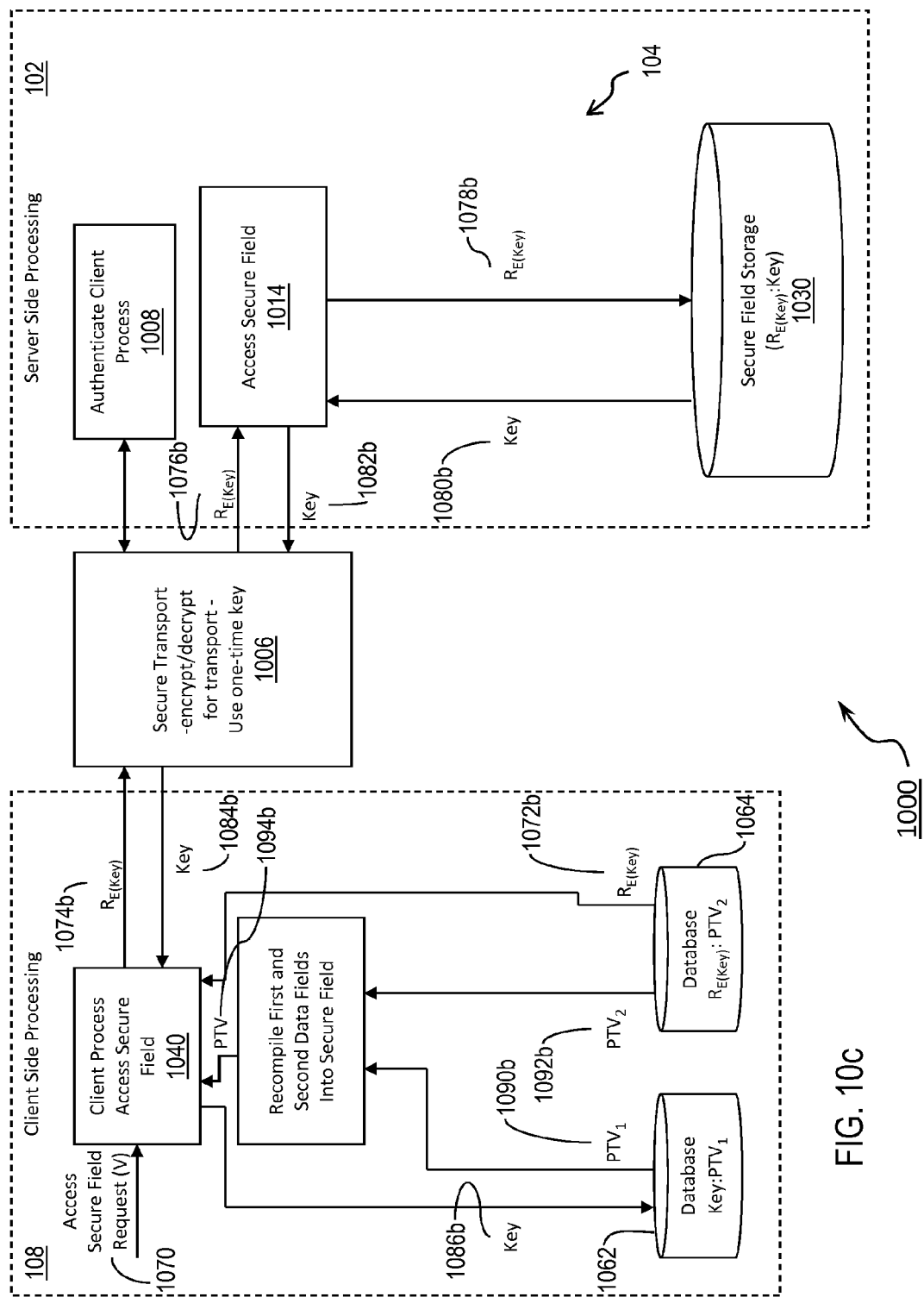
FIG. 10c depicts the networked system of FIG. 10a used to retrieve stored data according to another exemplary embodiment.
Figure 11A:
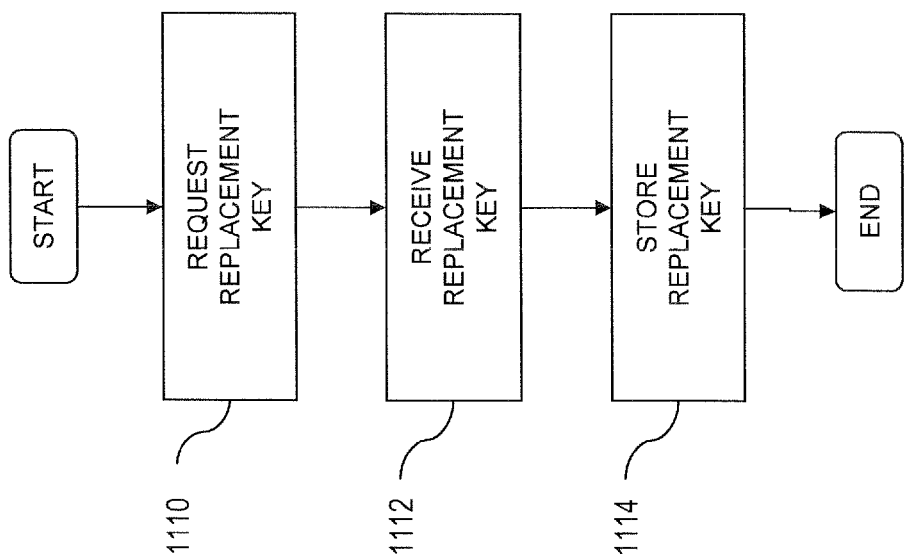
FIG. 11a is a flowchart depicting exemplary steps that may be performed by an exemplary client requesting a replacement key from the exemplary central encryption service of FIG. 10a, and FIG. 11b is a flowchart depicting exemplary steps that may be performed by the exemplary central encryption service of FIG. 10a providing a replacement key to an exemplary client in accordance with an exemplary embodiment.
Figure 11B:
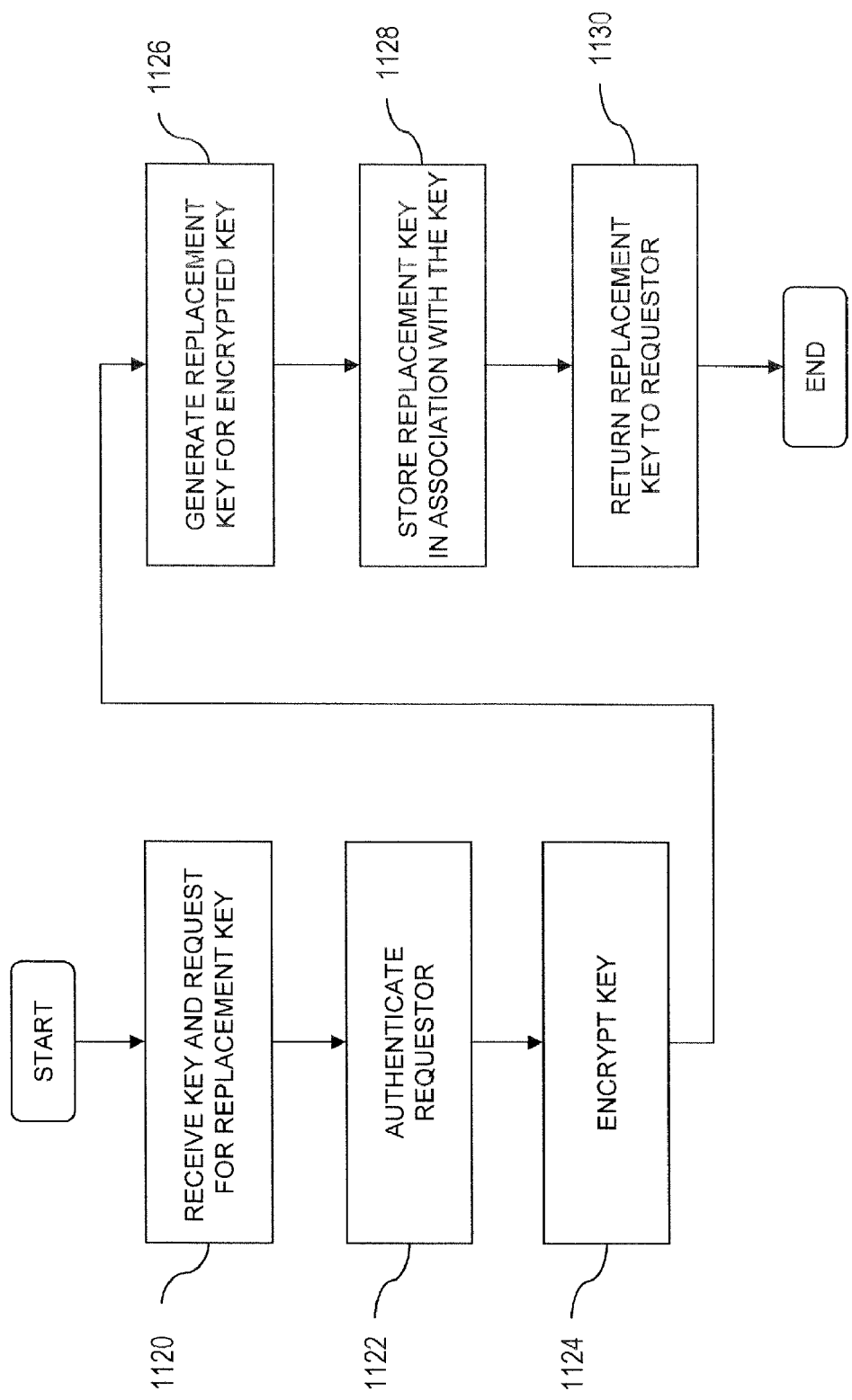
Figure 12A:
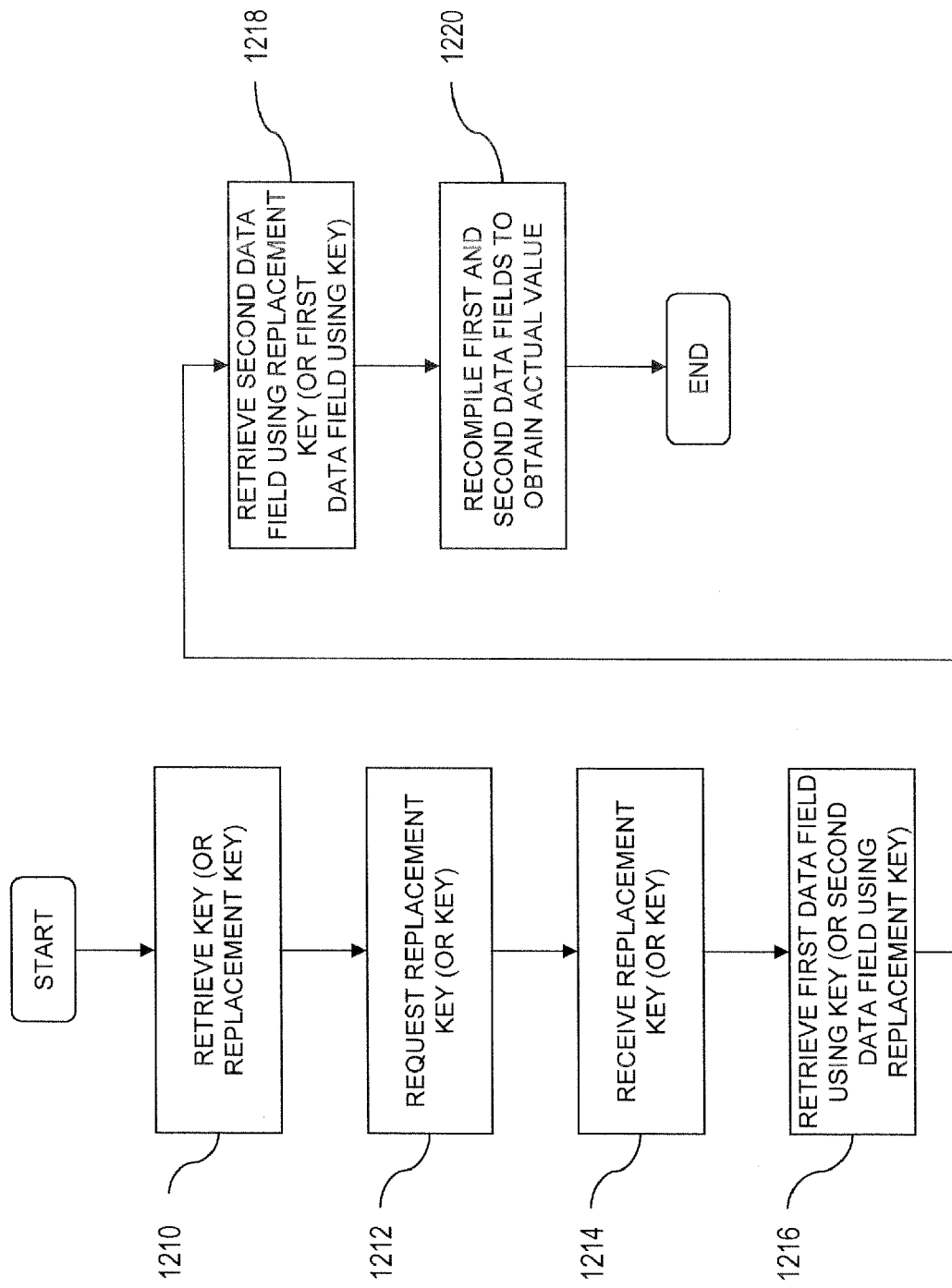
FIG. 12a is a flowchart depicting exemplary steps that may be performed by an exemplary client requesting a replacement key (or a key) from the exemplary central encryption service of FIG. 10b (or FIG. 10c)
Figure 12B:
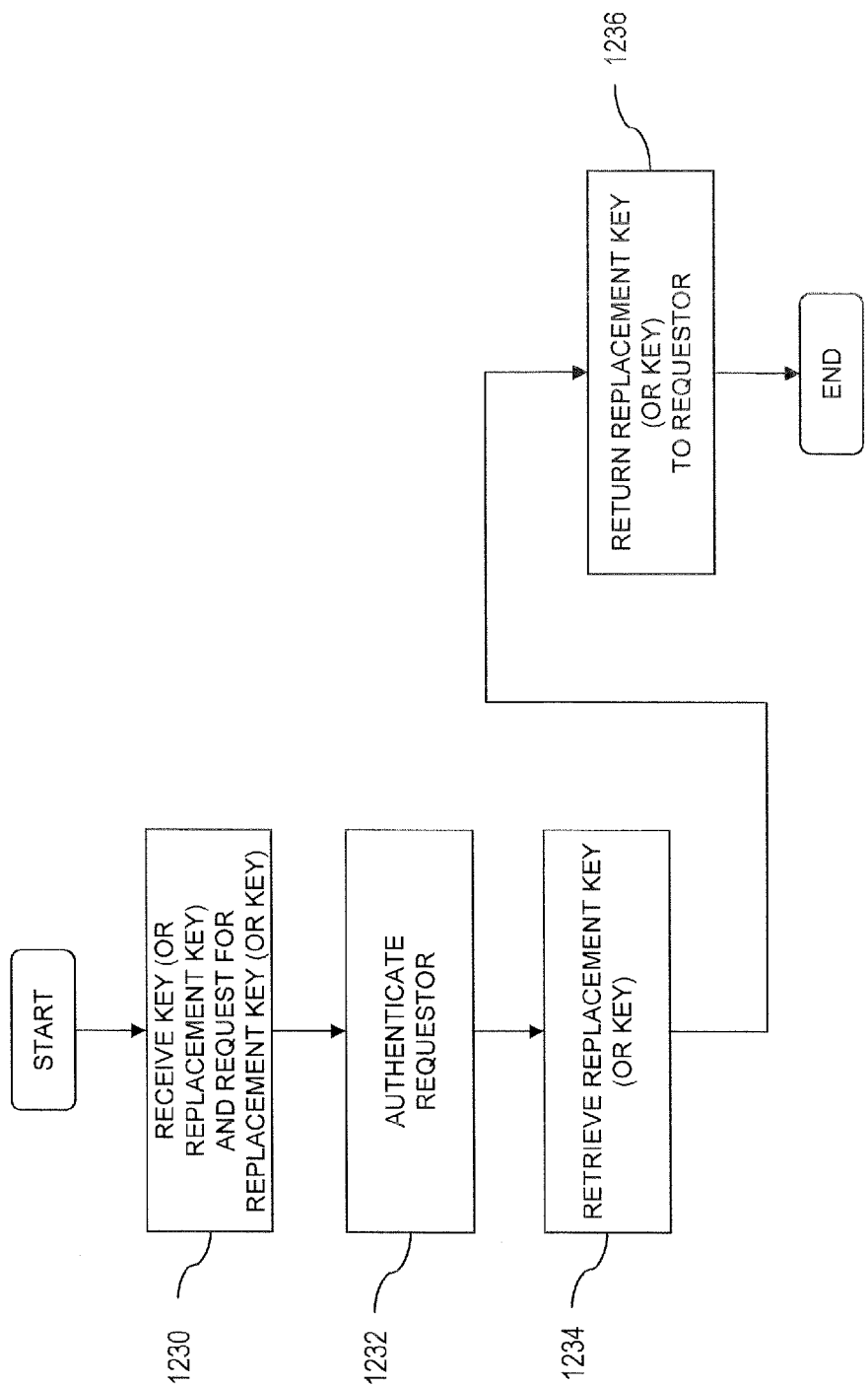
FIG. 12b is a flowchart depicting exemplary steps that may be performed by an exemplary central encryption service providing a replacement key (or a key) to an exemplary client in accordance with the exemplary embodiment of FIG. 10b (or FIG. 10c)

FIG. 10a depicts a networked system 1000 with an exemplary central encryption service for securely storing data for an exemplary requester such as a client in accordance with an exemplary embodiment, FIG. 10b depicts the networked system of FIG. 10a used to retrieve stored data according to an exemplary embodiment, and FIG. 10c depicts the networked system of FIG. 10a used to retrieve stored data according to another exemplary embodiment. Also, FIG. 11a is a flowchart depicting exemplary steps that may be performed by an exemplary client requesting a replacement key from the exemplary central encryption service of FIG. 10a, and FIG. 11b is a flowchart depicting exemplary steps that may be performed by the exemplary central encryption service of FIG. 10a providing a replacement key to an exemplary client in accordance with an exemplary embodiment. FIG. 12a is a flowchart depicting exemplary steps that may be performed by an exemplary client requesting a replacement key (or a key) from the exemplary central encryption service of FIG. 10b (or FIG. 10c), and FIG. 12b is a flowchart depicting exemplary steps that may be performed by an exemplary central encryption service providing a replacement key (or a key) to an exemplary client in accordance with the exemplary embodiment of FIG. 10b (or FIG. 10c).

The exemplary networked system 1000 depicts the client requesting secure storage 1002 for a sensitive data value. Referring to FIGS. 10a, 11a, and 11b, the client generates a store secure field request 1002 which is received by a client process store secure field 1040. The client process store secure field 1040 sends a plain text format 1042 of the sensitive data value to a unit 1050 to parse the plain text value into a first data field 1052 and a second data field 1053, for example, one data field could include an individuals name, while the other data field includes the individual's medical records. Then, a key is generated at 1054 using a key pool 1056, and the first data field and the key 1060 are sent to a database 1062 to be stored in conjunction with one another. The database 1062 is preferably openly accessible to employees of the client.

The key generated at 1054 is also sent to the client process store secure field 1040 at 1058, and then the client process store secure field 1040 sends a storage request with the key 1004 (step 1110) for secure transport via a secure transport 1006, which may transport the information via, for example, a SSL transport to the hardened facility 102. The hardened facility 102 receives the request (step 1120) and then authenticates the requester (step 1122), for example, the hardened facility 102 authenticates 1008 the client process which sent the data. If the requester is not authenticated, the hardened facility 102 may respond to the request with an "access denied" response.

If the requestor is authenticated, then the central encryption service receives the key 1012 to process the key via a store secure field 1014 process. The key 1016 is sent to an encryption device 1018 that uses encryption keys 1020 to encrypt the key (step 1124). The encrypted key and the key 1021 are sent to unit 1023 that generates a replacement key for the encrypted key using a replacement value pool 1025 (step 1126). The replacement key and the key 1022 are sent to a secure field storage 1030 where the replacement key and the key are stored in conjunction with one another (step 1128) for later retrieval by the client. The replacement key 1024 is sent back to the store secure field 1014 and then sent as replacement key 1026 to the secure transport 1006 for secure transport to the client process store secure field 1040 (step 1112 and step 1130) via a securely transported replacement key 1028. Then, the replacement key 1029 and the second data field 1053 are sent to a database 1064 to be stored in conjunction with one another (step 1114). The database 1064 is preferably openly accessible to employees of the client. The key stored in database 1062 can then be used to request the corresponding encrypted key from the hardened facility 102 when needed, as shown in FIG. 10b, or the replacement key stored in database 1064 can then be used to request the corresponding key from the hardened facility 102 when needed, as shown in FIG. 10c.

Referring to FIGS. 10b, 10c, 12a, and 12b, the client initiates an access secure field request 1070 to obtain the original secure field data value. In FIGS. 10b, 12a, and 12b, the client sends the key with the access request, while, in FIG. 10c and the parenthesis in FIGS. 12a and 12b, the client sends the replacement key with the access request.

Referring to FIGS. 10b, 12a, and 12b, the client process access secure field 1040 retrieves the appropriate key 1072a from database 1062 (step 1210), and sends the access request with the key 1074a (step 1212) for secure transport via a secure transport 1006, which may transport the information via, for example, a SSL transport to the hardened facility 102. The hardened facility 102 receives the request (step 1230) and then authenticates the requester (step 1232), for example, the hardened facility 102 authenticates 1008 the client process which sent the data. If the requester is not authenticated, the hardened facility 102 may respond to the request with an "access denied" response.

If the requestor is authenticated, then the central encryption service receives the key 1076a to process the key via the access secure field 1014 process. The key 1078a is sent to the secure field storage 1030 to retrieve the corresponding replacement key 1080a (step 1234), which is sent back to the access secure field 1014 and then sent as replacement key 1082a to the secure transport 1006 for secure transport to the client process access secure field 1040 via a securely transported replacement key 1084a (step 1214 and step 1236). Then, replacement key 1086a is sent to the database 1064 to retrieve the corresponding second data field 1090a (step 1218). The second data field 1090a from database 1064, and the first data field 1092a from database 1062 corresponding to the key (step 1216) are sent to unit 1050, where they are recompiled into a secure field as a plain text value 1094*a* (step 1220), and then sent back to the client process access secure field 1040.

Alternatively, FIG. 10*c* and the parenthesis in FIGS. 12*a* and 12*b* depict a situation where the replacement key is used to request retrieval of the key. The client initiates an access secure field request 1070 to obtain the original secure field data value. The client process access secure field 1040 retrieves the appropriate replacement key 1072*b* from database 1064 (step 1210 in parenthesis), and sends the access request with the replacement key 1074*b* (step 1212 in parenthesis) for secure transport via a secure transport 1006, which may transport the information via, for example, a SSL transport to the hardened facility 102. The hardened facility 102 receives the request (step 1230 in parenthesis) and then authenticates the requester (step 1232), for example, the hardened facility 102 authenticates 1008 the client process which sent the data. If the requester is not authenticated, the hardened facility 102 may respond to the request with an "access denied" response.

If the requester is authenticated, then the central encryption service receives the replacement key 1076*b* to process the replacement key via the access secure field 1014 process. The replacement key 1078*b* is sent to the secure field storage 1030 to retrieve the corresponding key 1080*b* (step 1234 in parenthesis), which is sent back to the access secure field 1014 and then sent as key 1082*b* to the secure transport 1006 for secure transport to the client process access secure field 1040 via a securely transported key 1084*b* (step 1214 in parenthesis and step 1236 in parenthesis). Then, the key 1086*b* is sent to the database 1062 to retrieve the corresponding first data field 1090*b* (step 1216 in parenthesis). The first data field 1090*b* from database 1062, and the second data field 1092*b* from database 1064 corresponding to the replacement key (step 1218 in parenthesis) are sent to unit 1050, where they are recompiled into a secure field as a plain text value 1094*b* (step 1220), and then sent back to the client process access secure field 1040.

One benefit of the exemplary embodiments of FIGS. 10*a*-10*c*, as compared to FIGS. 9*a*-9*c*, is that in FIGS. 10-10*c* the system 1000 sends a replacement key to the client, rather than an encrypted key as in FIGS. 9*a*-9*c*. By sending the client a replacement key instead of an encrypted key, the exemplary embodiments of FIGS. 10-10*c* eliminates an algorithmic link between the original key and the item returned to the client (i.e. the replacement key).

Figure 13:
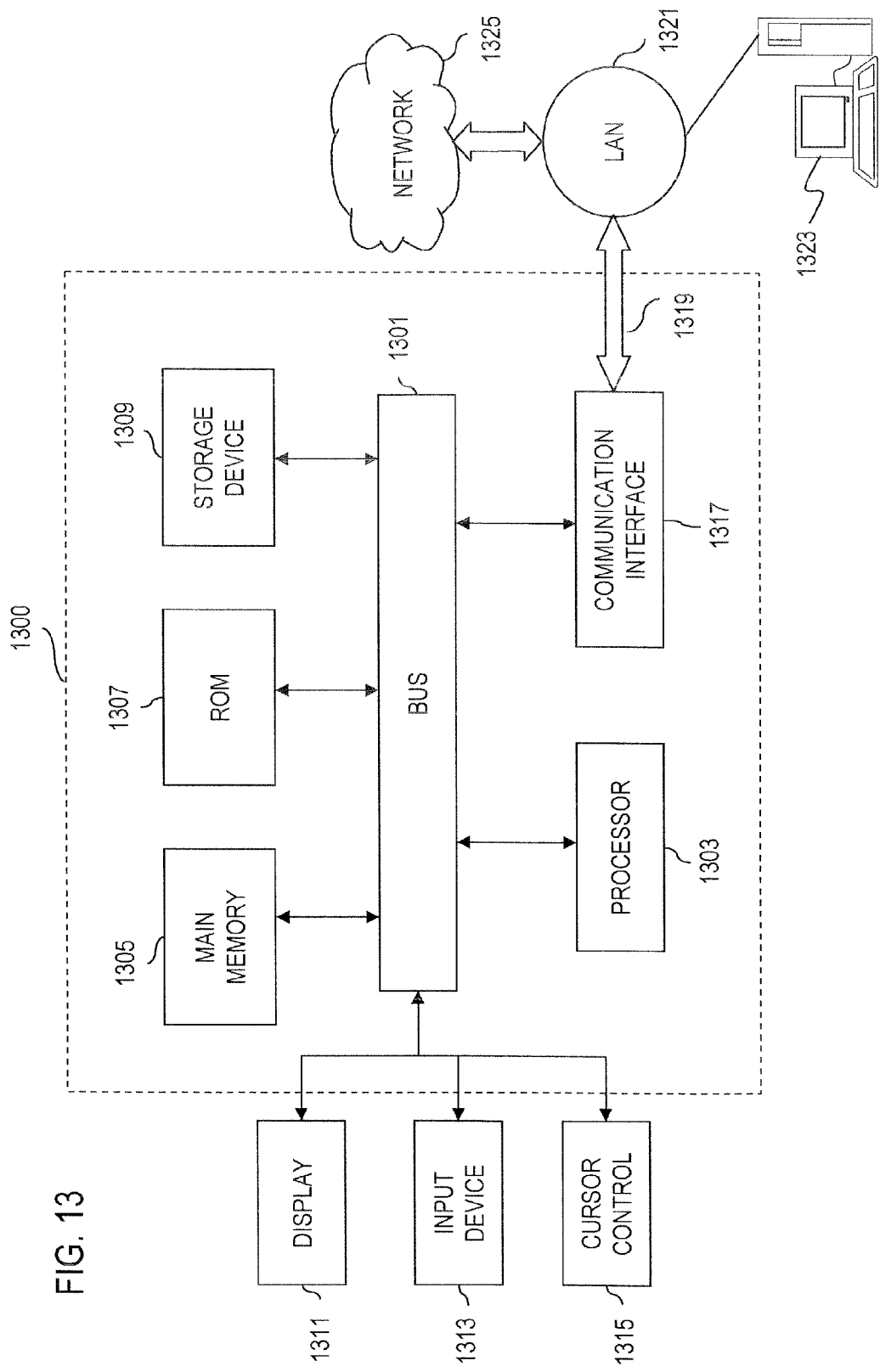
FIG. 13 depicts a computer system that can be used to implement an exemplary embodiment.

FIG. 13 illustrates a computer system 1300 upon which an embodiment according to the present invention can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to one embodiment, central encryption and storage of sensitive data values is provided by the computer system 1300 in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement the embodiment. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and/or software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 13, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an exemplary embodiment through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1305 for execution. Such a medium may take many forms, including but not limited to non-volatile media, volatile media, and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiment may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The following Appendix A includes a list of acronyms included herein, and is included for ease in reading.

APPENDIX A

| | |
|---|---|
| AES | Advanced Encryption Standard |
| API | Application Program Interfaces |
| ATM | Asynchronous Transfer Model |
| CD-ROM | Compact Disk Read Only Memory |
| CDRW | Compact Disk ReWriteable |
| CRT | Cathode Ray Tube |
| DSL | Digital Subscriber Line |
| DVD | Digital Video Disk |
| EPROM | Erasable Programmable Read Only Memory |
| CNo1 | Card Number1 |
| CNo2 | Card Number2 |
| ESSN | Encrypted Social Security Number |
| FPGA | Field Programmable Gate Arrays |
| IR | Infrared |
| ISDN | Integrated Services Digital Network |
| LAN | Local Area Network |
| PCMCIA | Personal Computer Memory Card International Association |
| PDA | Personal Digital Assistant |
| PROM | Programmable Read Only Memory |
| PT-SSN | Plain Text Format Social Security Number |
| RAM | Random Access Memory |
| R, E | Data Pair: Replacement Data Value and Encrypted Data Value |
| RF | Radio Frequency |
| ROM | Read Only Memory |
| R-SSN | Replacement Social Security Number |
| SSL | Secure Sockets Layer |
| SSN | Social Security Number |
| USB | Universal Serial Bus |
| WAN | Wide Area Network |
| XML | Extensible Markup Language |

What is claimed is:

1. A method comprising:

receiving, at a remote device, a storage request of a requesting device and a key for a secure storage of data, wherein the data is parsed, by the requesting device, into a first data field and a second data field, and the first data field is stored with the key in a first storage of the requesting device in a manner whereby the first data field is retrievable from the first storage using the key;

generating, by the remote device, a new key corresponding to the key, and storing the new key with the key in a remote storage of the remote device; and transmitting, by the remote device, the new key to the requesting device for storage of the second data field with the new key in a second storage of the requesting device in a manner whereby the second data field is retrievable from the second storage using the new key.

2. The method according to claim 1, wherein the new key is generated by encrypting the key.

3. The method according to claim 1, wherein the new key is generated by generating a replacement key for the key.

4. The method according to claim 1, wherein the new key is generated by encrypting the key and generating a replacement key for the encrypted key.

5. The method according to claim 1, wherein the new key does not have an algorithmic link to the key.

6. The method according to claim 1, further comprising:

receiving, from the requesting device, a retrieval request and the key;

retrieving the new key; and transmitting the new key to the requesting device for retrieval of the second data field.

7. The method according to claim 1, wherein the first and second data fields are stored in an unencrypted format.

8. A method comprising:

parsing, by a client device, data into a first data field and a second data field for secure storage of the data, and storing the first data field with a key in a first storage of the client device in a manner whereby the first data field is retrievable from the first storage using the key;

transmitting a request and the key, to a remote device, for generation of a new key corresponding to the key, wherein, in response to the request, the new key is generated and stored with the key in a remote storage of the remote device;

receiving, by the client device, the new key; and storing the second data field with the new key in a second storage of the client device in a manner whereby the second data field is retrievable from the second storage using the new key.

9. The method according to claim 8, wherein the new key is an encrypted version of the key.

10. The method according to claim 8, wherein the new key is a replacement key for the key.

11. The method according to claim 8, wherein the new key is a replacement key for an encrypted version of the key.

12. The method according to claim 8, further comprising:
transmitting a retrieval request and the key for retrieval of the new key;
receiving the new key;
retrieving the first data field from the first storage using the key;
retrieving the second data field from the second storage using the new key; and
restoring the data using the retrieved first data field and the retrieved second data field.

13. The method according to claim 8, wherein the first and second data fields are stored in an unencrypted format.

14. An apparatus, comprising:
at least one processor; and
at least one memory including computer program code for one or more programs,
the at least one memory and the computer program code configured to, with the at least one processor, cause the apparatus to perform at least the following:
receive, from a requesting device, a storage request and a key for a secure storage of data, wherein the data is parsed, by the requesting device, into a first data field and a second data field, and the first data field is stored with the key in a first storage of the requesting device in a manner whereby the first data field is retrievable from the first storage using the key;
generate a new key corresponding to the key;
transmit the new key to the requesting device for storage of the second data field with the new key in a second storage of the requesting device in a manner whereby the second data field is retrievable from the second storage using the new key; and
store the new key with the key.

15. The apparatus according to claim 14, wherein the apparatus is further caused to:
generate the new key by encrypting the key.

16. The apparatus according to claim 14, wherein the apparatus is further caused to:
generate the new key by generating a replacement key for the key.

17. The apparatus according to claim 14, wherein the apparatus is further caused to:
encrypt the key, and to generate the new key by generating a replacement key for the encrypted key.

18. The apparatus according to claim 14, wherein the new key does not have an algorithmic link to the key.

19. The apparatus according to claim 14, wherein the apparatus is further caused to,
receive, from the requesting device, a retrieval request and the key,
retrieve the new key, and
transmit the new key to the requesting device for retrieval of the second data field.

20. An apparatus according to claim 14, wherein the first and second data fields are stored in an unencrypted format.

21. An apparatus, comprising:
at least one processor; and
at least one memory including computer program code for one or more programs,
the at least one memory and the computer program code configured to, with the at least one processor, cause the apparatus to perform at least the following:
parse data into a first data field and a second data field for secure storage of the data;
generate a key;
transmit a request and the key to a remote device for generation of a new key corresponding to the key, wherein, in response to the request, the new key is generated and stored with the key in a remote storage of the remote device, and configured to receive the new key; and
store the first data field with the key in a manner whereby the first data field is retrievable from the at least one storage module using the key, and store the second data field with the new key in a manner whereby the second data field is retrievable from the at least one storage module using the new key.

22. The apparatus according to claim 21, wherein the apparatus is further caused to,
transmit a retrieval request and the key for retrieval of the new key,
receive the new key,
retrieve the first data field from the at least one storage module using the key,
retrieve the second data field from the at least one storage module using the new key, and
restore the data using the retrieved first data field and the retrieved second data field.

23. An apparatus according to claim 21, wherein the first and second data fields are stored in an unencrypted format.

* * * * *